(12) United States Patent
Han et al.

(10) Patent No.: US 12,716,382 B1
(45) Date of Patent: Aug. 25, 2026

(54) COMBUSTOR HAVING A DAMPER FOR A TURBINE ENGINE

(71) Applicant: General Electric Company, Evendale, OH (US)

(72) Inventors: Fei Han, Clifton Park, NY (US); Nicholas Arthur Magina, Saratoga Springs, NY (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 19/358,837

(22) Filed: Oct. 15, 2025

(51) Int. Cl.
*F02C 7/00* (2006.01)
*F23R 3/60* (2006.01)

(52) U.S. Cl.
CPC .................. *F02C 7/00* (2013.01); *F23R 3/60* (2013.01); *F05D 2260/96* (2013.01)

(58) Field of Classification Search
CPC .............. F23R 2900/00014; F23R 3/60; F05D 2260/09
See application file for complete search history.

(56) References Cited

U.S. PATENT DOCUMENTS 7,549,290 B2 * 6/2009 Holt ........................ F23R 3/002 60/725
7,926,278 B2 * 4/2011 Gerendas ................ F23R 3/002 60/725
8,567,197 B2 10/2013 Mueller et al.
8,733,496 B2 * 5/2014 Ono .......................... F23R 3/06 181/213
8,839,624 B2 * 9/2014 Schnell ................... F23R 3/002 60/725
8,991,185 B2 * 3/2015 Huber .................. F23M 20/005 60/725
9,334,804 B2 * 5/2016 Bothien ............... F23M 20/005
9,429,032 B2 8/2016 Bothien et al.
(Continued)

FOREIGN PATENT DOCUMENTS

EP 3663548 B1 5/2022
RU 2732532 C1 9/2020

OTHER PUBLICATIONS

Jean-François Mercier, et a;. "Influence of the neck shape for Helmholtz resonators," VC 2017 Acoustical Society of America. https://doi.org/10.1121/1.5017735, pp. 3703-3714. (Year: 2017).*
(Continued)

*Primary Examiner* — David P. Olynick
(74) *Attorney, Agent, or Firm* — Venable LLP; Peter T. Hrubiec; Michele V. Frank

(57) ABSTRACT

A combustor for a turbine engine. The combustor includes a combustion chamber and a damper. The combustion chamber is configured to combust a mixture of a fuel flow and a compressed air flow to generate combustion products. The damper is in fluid communication with the combustion chamber to damp an instability generated in the combustion chamber by the combustion products. The damper includes a damper cavity and one or more damper necks. The damper necks provide fluid communication between the damper cavity and the combustion chamber. The damper necks extend along a damper neck longitudinal centerline axis and include a tapered portion that extends at a damper neck taper angle α with respect to the damper neck longitudinal centerline axis.

20 Claims, 8 Drawing Sheets

(56) References Cited

U.S. PATENT DOCUMENTS 9,557,062 B2 * 1/2017 Maurer ..................... F23R 3/00
10,036,327 B2 7/2018 Tonon et al.
10,228,138 B2 * 3/2019 Theuer .................... F23R 3/002
10,724,739 B2 * 7/2020 Kim ........................ F23R 3/002
11,041,625 B2 6/2021 Purcell et al.
11,371,702 B2 * 6/2022 Berry ...................... F23R 3/283
11,434,826 B2 9/2022 Riou et al.
11,506,382 B2 11/2022 Hakim Doisneau et al.
11,702,992 B2 * 7/2023 Winkler .................... F02C 7/24 60/725
11,788,724 B1 * 10/2023 Nath ....................... F02C 7/045 60/772
2005/0166596 A1 * 8/2005 Sattinger .............. F23M 20/005 60/725
2005/0223707 A1 * 10/2005 Ikeda ........................ F23R 3/04 60/725
2006/0123791 A1 * 6/2006 Macquisten .............. F23R 3/50 60/725
2007/0169992 A1 * 7/2007 Wasif ................... F23M 20/005 181/293
2007/0283700 A1 * 12/2007 Gerendas .................. F23R 3/06 60/725
2008/0245072 A1 * 10/2008 Maeding ................... F23R 3/28 60/725
2011/0005233 A1 * 1/2011 Sadig ................... F23M 20/005 60/754
2013/0042627 A1 * 2/2013 Gerendas ............. F23M 20/005 60/725
2014/0109591 A1 * 4/2014 Bothien ............... F23M 20/005 60/791
2015/0096829 A1 * 4/2015 Bothien .................... F23R 3/16 181/204
2018/0156461 A1 * 6/2018 Theuer .................... F23R 3/002
2022/0282870 A1 * 9/2022 Kim ........................ F23R 3/286
2023/0033194 A1 * 2/2023 Gralki ....................... F23R 3/46

OTHER PUBLICATIONS

S.K. Tang, “On Helmholtz resonators with tapered necks,” Journal of Sound and Vibration 279 (2005) 1085-1096. (Year: 2005).*

Song, et al, “Perfect acoustic absorption of Helmholtz resonators via tapered necks,” Applied Physics Express 15, 084006 (2022). (Year: 2022).*

* cited by examiner

COMBUSTOR HAVING A DAMPER FOR A TURBINE ENGINE

TECHNICAL FIELD

The present disclosure relates generally to combustors, for example, in a turbine engine, having a damper.

BACKGROUND

Turbine engines generally include a propulsor (e.g., a fan or a propeller), a compressor section, a combustion section, and a turbine section arranged in flow communication with one another. The combustion section includes a combustor for generating combustion products and heat.

BRIEF DESCRIPTION OF THE DRAWINGS

Features and advantages will be apparent from the following, more particular, description of various exemplary embodiments, as illustrated in the accompanying drawings, wherein like reference numbers generally indicate identical, functionally similar, or structurally similar elements.

DETAILED DESCRIPTION

Figure 1:
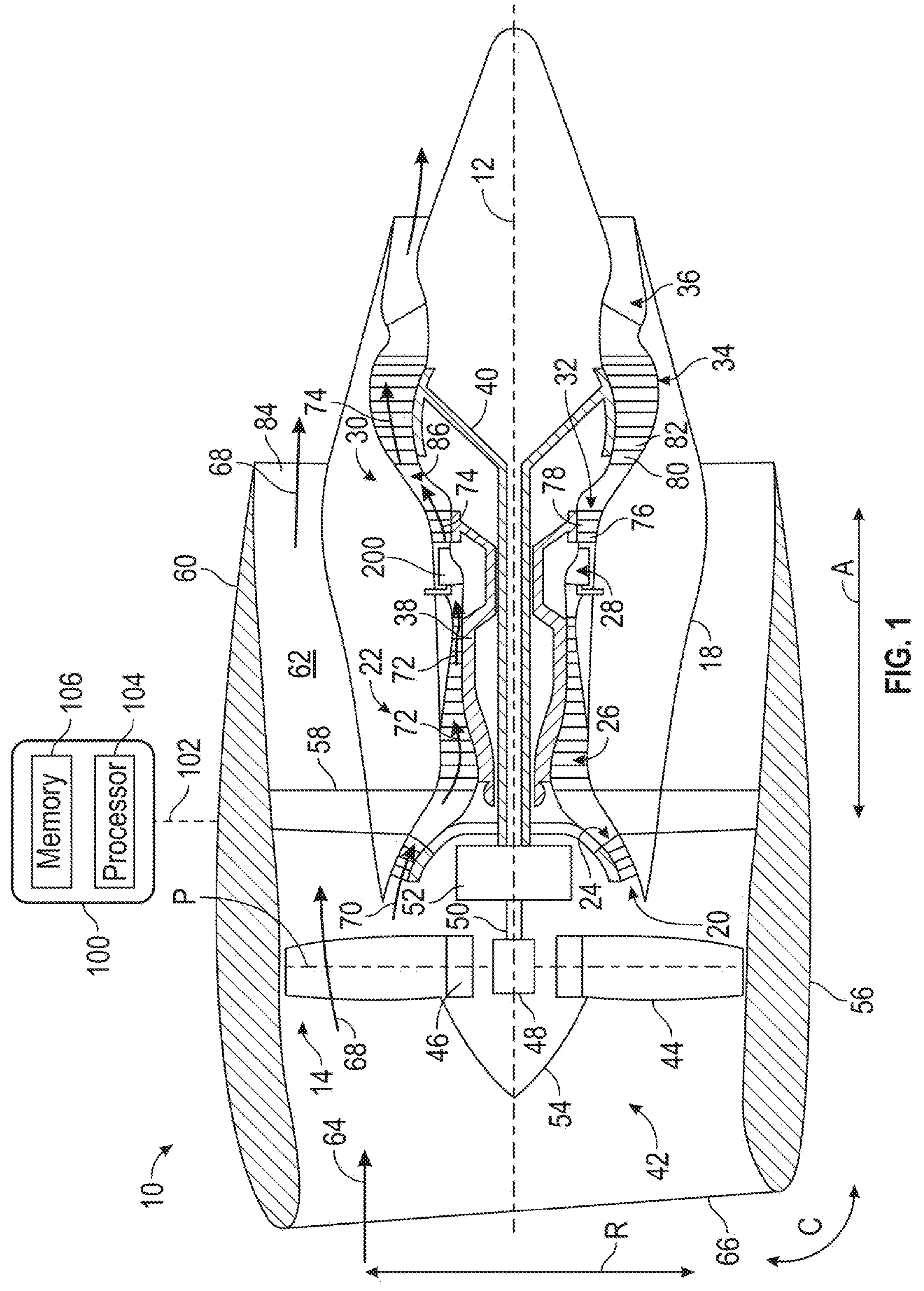
FIG. 1 illustrates a schematic cross-sectional view of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms “first,” “second,” “third,” “fourth,” and the like, may be used interchangeably to distinguish one component from another and are not intended to signify location or importance of the individual components.

The terms “upstream” and “downstream” refer to the relative direction with respect to fluid flow in a fluid pathway. For example, “upstream” refers to the direction from which the fluid flows, and “downstream” refers to the direction to which the fluid flows.

The terms “forward” and “aft” refer to relative positions within a turbine engine or an aircraft and refer to the normal operational attitude of the turbine engine or the aircraft. More particularly, forward and aft are used herein with reference to a direction of travel of the aircraft and a direction of propulsive thrust of the turbine engine.

The terms “coupled,” “fixed,” “attached,” “connected,” and the like, refer to both direct coupling, fixing, attaching, or connecting, as well as indirect coupling, fixing, attaching, or connecting through one or more intermediate components or features, unless otherwise specified herein. The terms include integral and unitary configurations (e.g., blisk rotor blade systems).

The singular forms “a,” “an,” and “the” include plural references unless the context clearly dictates otherwise.

As used herein, the terms “axial” and “axially” refer to directions and orientations that extend substantially parallel to a centerline of the turbine engine. Moreover, the terms “radial” and “radially” refer to directions and orientations that extend substantially perpendicular to the centerline of the turbine engine. In addition, as used herein, the terms “circumferential” and “circumferentially” refer to directions and orientations that extend arcuately about the centerline of the turbine engine.

As used herein, a “damper neck” is an opening or a hole in a damper that provides fluid communication from the damper to a combustion chamber of the turbine engine. In some embodiments, a damper has a single damper neck. In some embodiments, a damper has a plurality of damper necks.

As used herein, “acoustic damping” is a process, generated by a damper, that reduces noise by decreasing vibrational energy of sound waves within the combustion chamber. In particular, the damper utilizes acoustic damping to reduce an amplitude of the sound waves. Increasing the acoustic damping means to reduce the amplitude of the sound waves by a greater amount, and decreasing the acoustic damping means to reduce the amplitude of the sound waves by a lesser amount. An amount of acoustic damping can be indicated by a dynamic pressure reduction in the combustion chamber as compared to the dynamic pressure in the combustion chamber without a damper. “High” acoustic damping is when the dynamic pressure reduction is greater than 50%. “Low” acoustic damping is when the dynamic pressure reduction is less than or equal to 50%.

As used herein, “hot gas ingestion” is when hot gas (e.g., combustion products from the combustion chamber) enter the damper cavity through the damper necks. An amount of hot gas ingestion into the damper cavity can be indicated by a temperature rise ($\Delta T$) in the damper cavity during operation. “High” hot gas ingestion is when the temperature rise is greater than 10%. “Low” hot gas ingestion is when the temperature rise is less than or equal to 10%.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

The present disclosure provides acoustic dampers for combustion instability suppression in a combustor. When an instability is present in a combustion chamber of the combustor, the instability exhibits as a sinusoidal pressure with a significant amplitude that may damage the equipment, negatively impact combustor performance, and produce noise. Acoustic dampers are employed to damp or to lessen the instability by reducing the amplitude of the sound waves. The dampers of the present disclosure include a damper cavity and one or more openings, also referred to as damper necks, that provide fluid communication from the damper cavity to the combustion chamber.

During operation, the damper can ingest hot gas from the combustion chamber through the damper necks. The hot gas ingestion from the combustion chamber into the damper cavity through the damper necks reduces the damping capabilities of the damper (e.g., decreases the amount that the damper reduces the amplitude of the sound waves) and can lead to hardware damage. To prevent hot gas ingestion, the damper necks are designed to be small in diameter. However, decreasing the size of the damper necks reduces the damper capability to damp the instabilities (e.g., to reduce the amplitude of the sound waves). Further, making the damper necks larger increases the damper capability of the damper to damp the instabilities, but also increases the hot gas ingestion into the damper cavity.

The inventors, seeking a need to find a solution to this problem above, designed and tested several different turbine engine architectures and damper architectures in an effort to arrive at a damper architecture that met both the damper requirements and the hot gas ingestion requirements detailed above.

Referring now to the drawings, FIG. 1 is a schematic cross-sectional view of a turbine engine 10, taken along a longitudinal centerline axis 12 of the turbine engine 10, according to an embodiment of the present disclosure. As shown in FIG. 1, the turbine engine 10 defines an axial direction A (extending parallel to the longitudinal centerline axis 12 provided for reference), a radial direction R that is normal to the axial direction A, and a circumferential direction C extending about the longitudinal centerline axis 12. In general, the turbine engine 10 includes a fan section 14 and, in serial flow relationship, a compressor section 22, a combustion section 28, and a turbine section 30. The compressor section 22, the combustion section 28, and the turbine section 30 are substantially enclosed with an outer casing 18 that is substantially tubular and defines an annular inlet 20 of the turbine engine 10. As schematically shown in FIG. 1, the compressor section 22 includes a booster or a low-pressure (LP) compressor 24 followed downstream by a high-pressure (HP) compressor 26. The combustion section 28 includes a combustor 200 and is downstream of the compressor section 22. The turbine section 30 is downstream of the combustion section 28 and includes a high-pressure (HP) turbine 32 followed downstream by a low-pressure (LP) turbine 34. The turbine engine 10 further includes a jet exhaust nozzle section 36 that is downstream of the turbine section 30, a high-pressure (HP) shaft 38 or a spool, and a low-pressure (LP) shaft 40. The HP shaft 38 drivingly connects the HP turbine 32 to the HP compressor 26. The HP turbine 32 and the HP compressor 26 rotate in unison through the HP shaft 38. The LP shaft 40 drivingly connects the LP turbine 34 to the LP compressor 24. The LP turbine 34 and the LP compressor 24 rotate in unison through the LP shaft 40. The compressor section 22, the combustion section 28, the turbine section 30, and the jet exhaust nozzle section 36 together define a core air flow path.

For the embodiment depicted in FIG. 1, the fan section 14 includes a fan 42 (e.g., a variable pitch fan) having a plurality of fan blades 44 coupled to a disk 46 in a spaced apart manner. As depicted in FIG. 1, the fan blades 44 extend outwardly from the disk 46 generally along the radial direction R. In the case of a variable pitch fan, the plurality of fan blades 44 are rotatable relative to the disk 46 about a pitch axis P by virtue of the fan blades 44 being operatively coupled to an actuation member 48 configured to collectively vary the pitch of the fan blades 44 in unison. The fan blades 44, the disk 46, and the actuation member 48 are together rotatable about the longitudinal centerline axis 12 via a fan shaft 50 that is powered by the LP shaft 40 across a power gearbox, also referred to as a gearbox assembly 52. In this way, the fan 42 is drivingly coupled to, and powered by, the turbine section 30 and the turbine engine 10 is an indirect drive engine. The gearbox assembly 52 is shown schematically in FIG. 1. The gearbox assembly 52 is a reduction gearbox assembly for adjusting the rotational speed of the fan shaft 50 and, thus, the fan 42 relative to the LP shaft 40 when power is transferred from the LP shaft 40 to the fan shaft 50.

Referring still to the exemplary embodiment of FIG. 1, the disk 46 is covered by a rotatable fan hub 54 aerodynamically contoured to promote an airflow through the plurality of fan blades 44. In addition, the fan section 14 includes an annular fan casing or a nacelle 56 that circumferentially surrounds the fan 42 and at least a portion of the outer casing 18 by a plurality of outlet guide vanes 58 that are circumferentially spaced about the nacelle 56 and the outer casing 18. Moreover, a downstream section 60 of the nacelle 56 extends over an outer portion of the outer casing 18, and, with the outer casing 18, defines a bypass airflow passage 62 therebetween.

During operation of the turbine engine 10, a volume of air 64 enters the turbine engine 10 through an inlet 66 of the nacelle 56 or the fan section 14. As the volume of air 64 passes across the fan blades 44, a first portion of air, also referred to as bypass air 68, is routed into the bypass airflow passage 62, and a second portion of air, also referred to as core air 70, is routed into the upstream section of the core air flow path through the annular inlet 20 of the LP compressor 24. The ratio between the bypass air 68 and the core air 70 is commonly known as a bypass ratio. The pressure of the core air 70 is then increased, generating compressed air 72. The compressed air 72 is routed through the HP compressor 26 and into the combustion section 28, wherein the compressed air 72 is mixed with fuel and ignited to generate combustion gases 74.

The combustion gases 74 are routed into the HP turbine 32 and expanded through the HP turbine 32 where a portion of thermal energy and kinetic energy from the combustion gases 74 is extracted via one or more stages of HP turbine stator vanes 76 and HP turbine rotor blades 78 that are coupled to the HP shaft 38. This causes the HP shaft 38 to rotate, thereby supporting operation of the HP compressor 26 (self-sustaining cycle). In this way, the combustion gases 74 do work on the HP turbine 32. The combustion gases 74 are then routed into the LP turbine 34 and expanded through the LP turbine 34. Here, a second portion of thermal energy and the kinetic energy is extracted from the combustion gases 74 via one or more stages of LP turbine stator vanes 80 and LP turbine rotor blades 82 that are coupled to the LP shaft 40. This causes the LP shaft 40 to rotate, thereby supporting operation of the LP compressor 24 (self-sustaining cycle) and rotation of the fan 42 via the gearbox assembly 52. In this way, the combustion gases 74 do work on the LP turbine 34.

The combustion gases 74 are subsequently routed through the jet exhaust nozzle section 36 to provide propulsive thrust. Simultaneously, the bypass air 68 is routed through the bypass airflow passage 62 before being exhausted from a fan nozzle exhaust section 84 of the turbine engine 10, also providing propulsive thrust. The HP turbine 32, the LP turbine 34, and the jet exhaust nozzle section 36 at least partially define a hot gas path 86 for routing the combustion gases 74 through the compressor section 22, the combustion section 28, and the turbine section 30.

The turbine engine 10 may be communicatively and operatively coupled to an engine controller 100 along a communication line 102. The engine controller 100 is configured to operate various aspects of the turbine engine 10. The engine controller 100 may be a Full Authority Digital Engine Control (FADEC). In this embodiment, the engine controller 100 is a computing device having one or more processors 104 and one or more memories 106. The processor 104 may be any suitable processing device, including, but not limited to, a microprocessor, a microcontroller, an integrated circuit, a logic device, a programmable logic controller (PLC), an application-specific integrated circuit (ASIC), and/or a Field Programmable Gate Array (FPGA). The memory 106 may include one or more computer-readable media, including, but not limited to, non-transitory computer-readable media, a computer-readable non-volatile medium (e.g., a flash memory), a RAM, a ROM, hard drives, flash drives, and/or other memory devices.

The memory 106 may store information accessible by the processor 104, including computer-readable instructions that may be executed by the processor 104. The instructions may be any set of instructions or a sequence of instructions that, when executed by the processor 104, causes the processor 104 and the engine controller 100 to perform operations. In some embodiments, the instructions may be executed by the processor 104 to cause the processor 104 to complete any of the operations and functions for which the engine controller 100 is configured, as will be described further below. The instructions may be software written in any suitable programming language or may be implemented in hardware. Additionally, and/or alternatively, the instructions may be executed in logically and/or virtually separate threads on the processor 104. The memory 106 may further store data that may be accessed by the processor 104.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between components and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

The engine controller 100 may be communicatively coupled to one or more sensors employed in the methods of the present disclosure, such as, for example, vibration sensors (such as accelerometers), temperature sensors, speed sensors, and other sensors within the turbine engine 10. For example, the engine controller 100 may receive, and, optionally, store or record, data or information from the one or more sensors. The engine controller 100 may also control motoring of the turbine engine (e.g., rotation of the rotor described in more detail to follow).

The turbine engine 10 depicted in FIG. 1 is by way of example only. In other exemplary embodiments, the turbine engine 10 may have any other suitable configuration. For example, in other exemplary embodiments, the fan 42 may be configured in any other suitable manner (e.g., as a variable pitch fan or a fixed pitch fan) and further may be supported using any other suitable fan frame configuration. Moreover, in other exemplary embodiments, any other suitable number or configuration of compressors, turbines, shafts, or a combination thereof may be provided. In other exemplary embodiments, the engine may also be a direct drive engine, which does not have a power gearbox (e.g., no gearbox assembly 52). The fan speed is the same as the LP shaft speed for a direct drive engine. In still other exemplary embodiments, aspects of the present disclosure may be incorporated into any other suitable turbine engine, such as, for example, turbofan engines, propfan engines, turboprop engines, unducted engines, or turboshaft engines.

Figure 2:
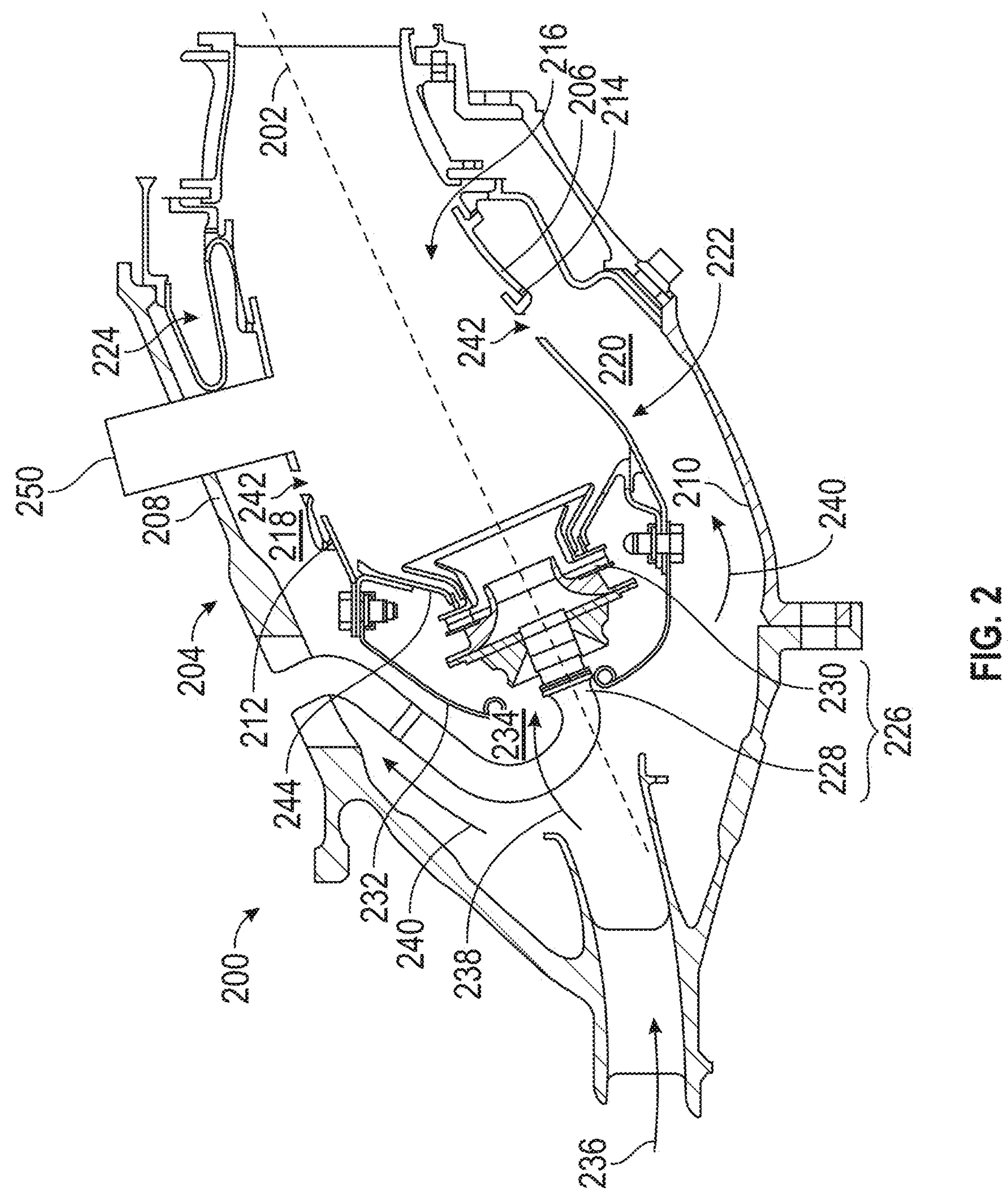
FIG. 2 illustrates a schematic cross-sectional view of a combustor for the turbine engine of FIG. 1, taken along the longitudinal centerline axis of the turbine engine, according to the present disclosure.

FIG. 2 illustrates a cross-sectional view of the combustor 200 taken along the longitudinal centerline axis 12 (FIG. 1). The combustor 200 has a longitudinal centerline axis 202. The combustor 200 includes a combustor casing 204 and a combustor liner 206. The combustor casing 204 has an outer casing 208 and an inner casing 210, and the combustor liner 206 has an outer liner 212 and an inner liner 214. A combustion chamber 216 is formed within the combustor liner 206. More specifically, the outer liner 212 and the inner liner 214 are disposed between the outer casing 208 and the inner casing 210. The outer liner 212 and the inner liner 214 are spaced radially from each other such that the combustion chamber 216 is defined therebetween. The outer casing 208 and the outer liner 212 form an outer passage 218 therebetween, and the inner casing 210 and the inner liner 214 form an inner passage 220 therebetween. As illustrated, the combustor 200 is a single annular combustor, but, in other embodiments, the combustor 200 may be any other combustor, such as, for example, a can combustor, a can-annular combustor, or the like.

The combustion chamber 216 has a forward end 222 (upstream end) and an aft end 224 (downstream end). A fuel nozzle assembly 226 is positioned at the forward end 222 of the combustion chamber 216. The fuel nozzle assembly 226 includes a fuel nozzle 228 and a swirler 230. In the example of an annular combustor, such as combustor 200, the fuel nozzle assembly 226 may be one of a plurality of fuel nozzle assemblies 226 arranged in an annular configuration in the circumferential direction around the longitudinal centerline axis 12 (FIG. 1).

As discussed above, and with reference to FIGS. 1 and 2, the compressor section 22, the combustion section 28 (including the combustor 200), and the turbine section 30 form, at least in part, a flow path for the core air 70. The core air 70 entering the annular inlet 20 is compressed by the LP compressor 24 and the HP compressor 26, and flows to the combustor 200 as a compressed air flow 236. A cowl assembly 232 is coupled to upstream ends of the outer liner 212 and the inner liner 214, respectively. An annular opening 234 formed in the cowl assembly 232 enables a first portion 238 of the compressed air flow 236 to enter the combustor 200. The first portion 238 flows through the annular opening 234 to support combustion within the combustion chamber 216. A second portion 240 of the compressed air flow 236 flows around the outside of the combustor liner 206 through the outer passage 218 and the inner passage 220. The second portion 240 may be introduced into the combustion chamber 216 through a plurality of circumferentially spaced dilution holes 242 formed in the combustor liner 206 at one or more positions downstream of the fuel nozzle assembly 226. Although a single dilution hole 242 is shown in each of the outer liner 212 and the inner liner 214, a plurality of dilution holes 242 may be provided in a circumferential direction about the longitudinal centerline axis 202. Furthermore, the dilution holes 242 may be provided in the outer liner 212 or the inner liner 214, or both the outer liner 212 and the inner liner 214.

Each fuel nozzle assembly 226 of the plurality of fuel nozzle assemblies 226 is coupled to a dome 244. Each fuel nozzle assembly 226 receives the first portion 238 of the compressed air flow 236 from the annular opening 234. The swirler 230 of the fuel nozzle assembly 226 generates a swirl (e.g., turbulence) in the first portion 238 as a turbulent air flow. The fuel nozzle 228 injects fuel into the turbulent air flow and the turbulence promotes rapid mixing of the fuel with the air. The resulting mixture of the fuel and the compressed air is discharged into the combustion chamber 216, and is combusted in the combustion chamber 216, generating combustion gases (combustion products) and heat, which accelerate as the combustion gases leave the combustion chamber 216.

A damper 250, as described in more detail to follow, is provided within the combustor 200. The damper 250 can extend through at least one of the outer liner 212, the inner liner 214, or the dome 244. In FIG. 2, the damper 250 extends through the outer casing 208 and the outer liner 212 of the combustor 200. Although illustrated extending through the outer casing 208, in some examples, the damper 250 may be fully within the outer casing 208, such that the damper 250 extends only through the outer liner 212, but not through the outer casing 208. The damper 250 may be an acoustic damper. A single damper 250 is illustrated in FIG. 2. The damper 250 may, however, include a plurality of dampers distributed circumferentially around the combustor 200. Each damper 250 provided extends through the outer liner 212, the inner liner 214, or the dome 244 such that the damper 250 communicates (is in fluid communication) with the combustion chamber 216.

Figure 3A:
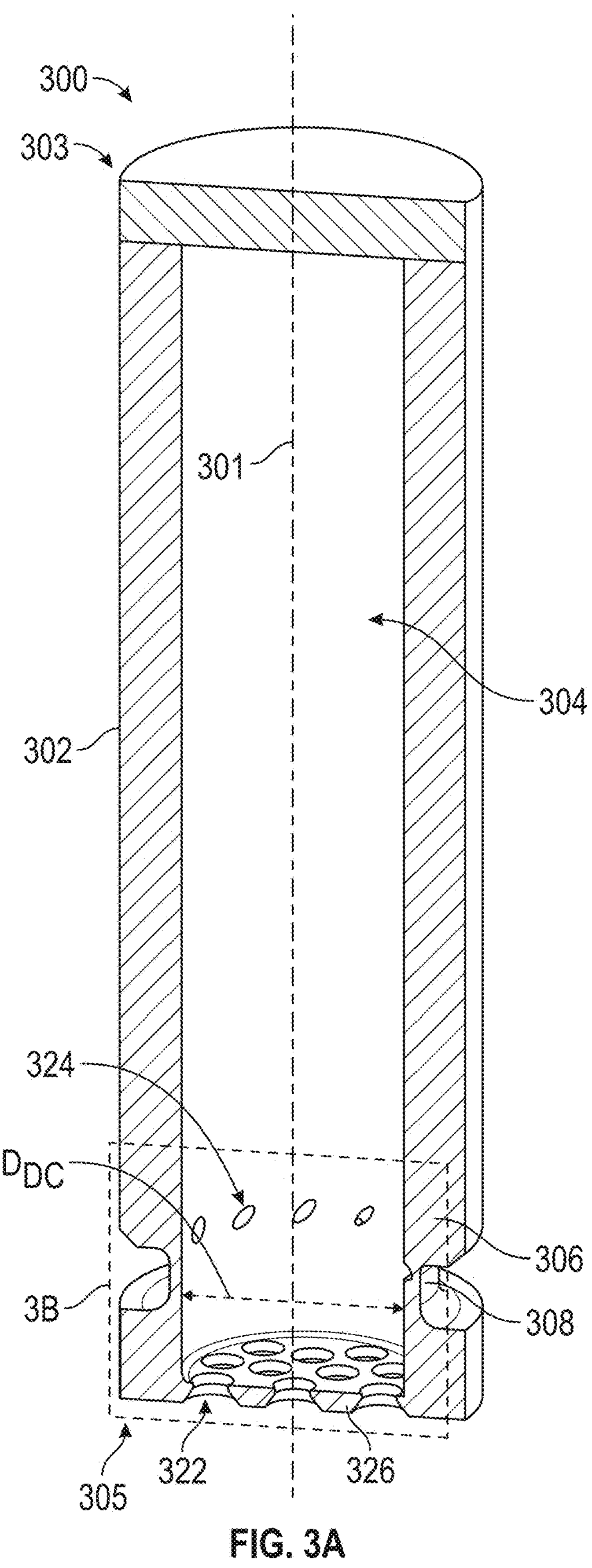
FIG. 3A illustrates a schematic cross-sectional view of a damper for the combustor of FIG. 2, taken along the longitudinal centerline axis of the turbine engine, and isolated from the combustor, according to the present disclosure.
Figure 3B:
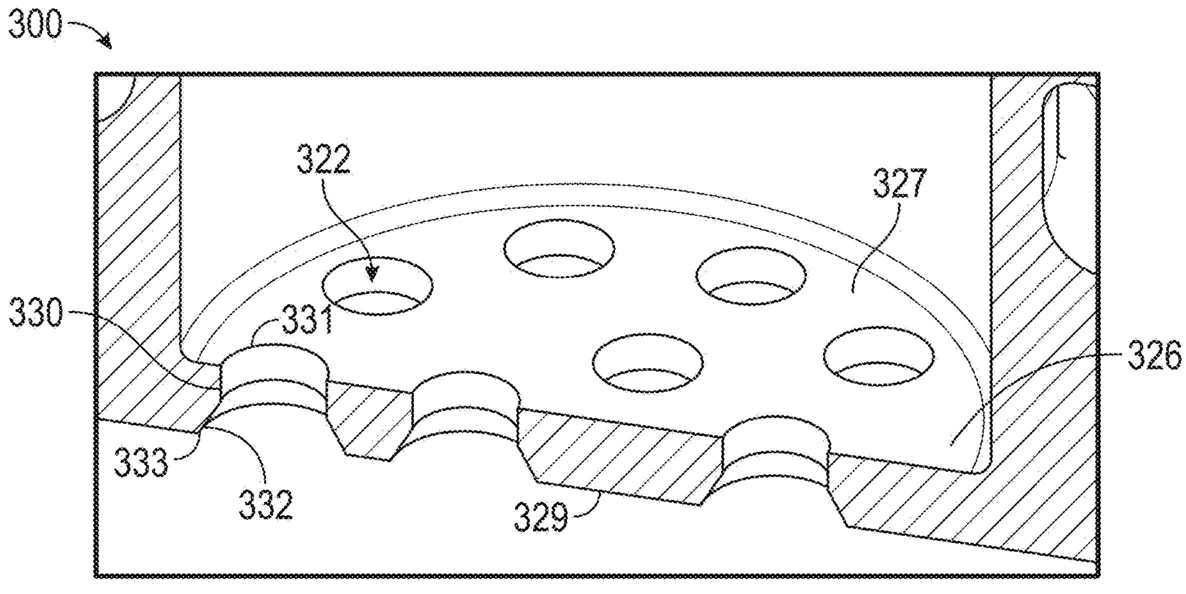
FIG. 3B illustrates a schematic cross-sectional view of a bottom of the damper of FIG. 3A, taken at detail 3B in FIG. 3A, according to the present disclosure.

FIG. 3A illustrates a schematic cross-sectional view of a damper 300 for the combustor 200 of FIG. 2, taken along the longitudinal centerline axis 12 of the turbine engine 10 (FIG. 1), and isolated from the combustor 200, according to the present disclosure. FIG. 3B illustrates a schematic cross-sectional view of a bottom of the damper 300, taken at detail 3B in FIG. 3A, according to the present disclosure. The damper 300 can be utilized as the damper 250 (FIG. 2) of the combustor 200.

The damper 300 includes a damper body 302 that extends along a damper longitudinal centerline axis 301 from a proximal end 303 to a distal end 305. In some examples, the damper body 302 is a unitary, single piece body. The damper 300 includes a damper cavity 304 within the damper body 302. The damper body 302 has a damper wall 306 that is generally cylindrical in shape such that the damper cavity 304 is cylindrical. While the damper cavity 304 has a uniform interior volume along the damper longitudinal centerline axis 301, the damper cavity 304 can have a varying interior volume that is defined by the damper wall 306. The damper body 302 also includes a groove 308 that corresponds to an opening in the outer liner 212 (FIG. 2), the inner liner 214 (FIG. 2), or the dome 244 (FIG. 2) through which the groove 308 is inserted for mounting the damper 300 to the outer liner 212, the inner liner 214, or the dome 244. In some embodiments, the groove 308 can be omitted such that the damper body 302 can fit within the opening in the outer liner 212, the inner liner 214, or the dome 244 without the use of the groove 308.

The damper cavity 304 is in fluid communication with the combustion chamber 216 (FIG. 2) through one or more openings, also referred to herein as one or more damper necks 322, formed in an orifice plate 326. The one or more damper necks 322 function as a neck of a Helmholtz resonator. The damper cavity 304 is in fluid communication with the outer passage 218 (FIG. 2) with one or more openings 324.

The orifice plate 326 is disposed at an end of the damper body 302. The orifice plate 326 has an inlet side 327 and an outlet side 329. The inlet side 327 is disposed to face the damper cavity 304 such that the inlet side 327 forms a portion of the damper cavity 304. The outlet side 329 is disposed to face the combustion chamber 216 (FIG. 2).

In operation, compressed air (e.g., the second portion 240 of the compressed air flow 236) flows into the damper cavity 304 through the one or more openings 324. The damper cavity 304 directs the compressed air towards the orifice plate 326. The orifice plate 326 directs the compressed air into the combustion chamber (e.g., the combustion chamber 216 of FIG. 2) through the one or more damper necks 322 from the inlet side 327 to the outlet side 329. When an instability is present in the combustion chamber 216 (FIG. 2), the instability exhibits as a sinusoidal pressure with a large amplitude that may damage the combustor 200. The damper 300 damps or lessens the instability. In particular, the pressure fluctuations in the combustion gases within the combustion chamber 216 can cause a portion of the combustion gases to push against the compressed air in the one or more damper necks 322, causing the compressed air in the damper necks 322 to oscillate. In this way, the compressed air in the damper necks 322 acts like a mass and the compressed air in the damper cavity 304 acts like a spring. The oscillation of the compressed air in the damper necks 322 absorbs energy from the incoming instable combustion gases, which causes the sound from the combustion chamber 216 to cancel out or diminish. The damper 300 provides the ability to customize and to augment the acoustic attenuation characteristics within the combustion chamber 216. The damper 300 allows for the damper to have damping capabilities in a broad frequency range that dampens multi-tonal behavior in the combustion chamber 216.

As shown in FIG. 3A, the damper 300 has a damper cavity diameter $D_{DC}$. The damper cavity diameter $D_{DC}$ is defined as a diameter (an inner diameter at an inner surface) of the damper cavity 304 at the distal end 303 that passes through the longitudinal centerline axis 301.

With reference to FIG. 3B, the damper necks 322 include a first portion, also referred to as a straight portion 330, and a second portion, also referred to as a tapered portion 332. The first portion (the straight portion 330) is straight and extends parallel with the damper longitudinal centerline axis 301 (FIG. 3A) from an inlet side 327 through the orifice plate 326 towards an outlet side 329. The second portion (the tapered portion 332) is tapered and extends from the first portion 330 towards the outlet side 329. The tapered portion 332 extends at a damper neck taper angle with respect to a damper neck longitudinal centerline axis, as detailed further below. In FIGS. 3A and 3B, the straight portion 330 defines a damper neck inlet 331 of the damper necks 322 and the tapered portion 332 defines a damper neck outlet 333 of the damper necks 322. The portions of the damper necks 322 (e.g., the first portion and the second portion) detailed herein are to distinguish between portions of the damper necks 322 that have different cross-sectional shapes, such as, for example, distinguishing between a straight portion and a tapered portion, or between a first tapered portion and a second tapered portion. In some embodiments. The damper necks 322 can be considered to have a single portion.

Figure 4:
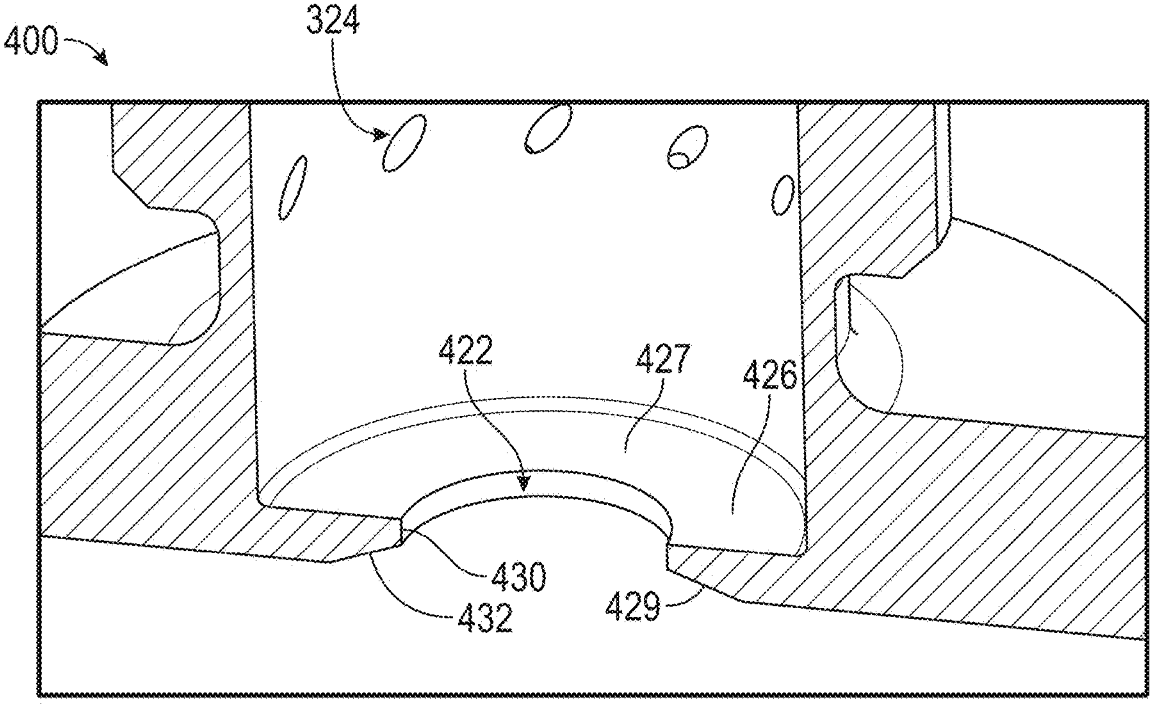
FIG. 4 illustrates a schematic cross-sectional view of a bottom of a damper for the combustor of FIG. 2, taken along a longitudinal centerline axis of the turbine engine, according to another embodiment.

FIG. 4 illustrates a schematic cross-sectional view of a bottom of a damper 400, according to another embodiment. The damper 400 is substantially similar to the damper 300 of FIGS. 3A and 3B. The same reference numerals will be used for components of the damper 400 that are the same as or similar to the components of the damper 300 discussed above. The description of these components above also applies to this embodiment, and a detailed description of these components is omitted here.

The damper 400 includes an orifice plate 426 having a damper neck 422, an inlet side 427, and an outlet side 429. As shown in FIG. 4, the orifice plate 426 includes a single damper neck 422 rather than a plurality damper necks. The damper neck 422 is larger than each of the one or more damper necks 322 (FIGS. 3A and 3B). The damper neck 422 includes a first portion, also referred to as a straight portion 430 and a second portion, also referred to as a tapered portion 432.

Figure 5:
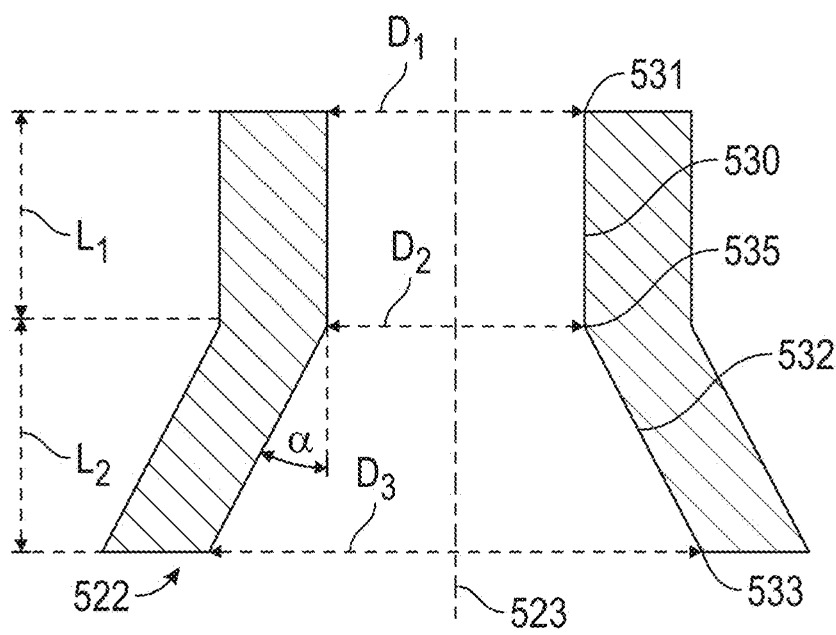
FIG. 5 illustrates a schematic cross-sectional view of a damper neck of a damper, taken along a damper neck longitudinal centerline axis of the damper neck, according to the present disclosure.

FIG. 5 illustrates a schematic cross-sectional view of a damper neck 522 of a damper, taken along a damper neck longitudinal centerline axis 523 of the damper neck 522, according to the present disclosure. The damper neck 522 can be utilized as the damper neck 322 of FIGS. 3A and 3B or the damper neck 422 of FIG. 4.

The damper neck 522 extends along the damper neck longitudinal centerline axis 523 from a proximal end at a damper neck inlet 531 to a distal end at a damper neck outlet 533. The damper neck inlet 531 is in fluid communication with the damper cavity of the damper (e.g., the damper cavity 304 of FIG. 3A). The damper neck outlet 533 is in fluid communication with the combustion chamber (e.g., the combustion chamber 216 of FIG. 2).

The damper neck 522 includes a first portion, also referred to as a straight portion 530, and a second portion, also referred to as a tapered portion 532. The first portion (the straight portion 530) is straight and extends from a first portion proximal end to a first portion distal end. In particular, the first portion proximal end is located at the damper neck inlet 531 and the first portion distal end is located at a transition portion 535. The transition portion 535 defines a portion of the damper neck 522 that connects the straight portion 530 and the tapered portion 532 and is a point or an area of damper neck 522 where the cross-sectional shape of the damper neck 522 changes (e.g., from straight to tapered, from tapered to straight, or from tapered to tapered). In this way, the straight portion 530 extends from the proximal end (e.g., the damper neck inlet 531) of the damper neck 522 to the tapered portion 532. While the transition portion 535 has a sharp edge, the transition portion 535 can included a continuous curved edge.

The second portion (the tapered portion 532) is tapered and extends from a second portion proximal end to a second portion distal end. In particular, the second portion proximal end is located at the transition portion 535 and the second portion distal end is located at the damper neck outlet 533. In this way, the tapered portion 532 extends from the straight portion 530 to the damper neck outlet 533. While the tapered portion 532 is depicted as being a straight wall, the tapered portion 532 can be curved.

The tapered portion 532 extends from the straight portion 530 at a damper neck taper angle $\alpha$. The damper neck taper angle $\alpha$ is defined as an angle of the tapered portion 532 with respect to the damper neck longitudinal centerline axis 523. The damper neck taper angle $\alpha$ is greater than or less than zero degrees (0°), less than ninety degrees (90°), and greater than negative ninety degrees (−90°). When the damper neck taper angle $\alpha$ is negative, the tapered portion 532 tapers inward toward the damper neck longitudinal centerline axis 523. When the damper neck taper angle $\alpha$ is positive, the tapered portion 532 tapers outward away from the damper neck longitudinal centerline axis 523. In FIG. 5, the damper neck taper angle $\alpha$ is positive such that the tapered portion 532 tapers outward away from the damper neck longitudinal centerline axis 523. In some embodiments, the damper neck taper angle $\alpha$ is in a range from negative sixty-eight degrees (−68°) to negative twenty-three degrees (−23°) or is in a range from twenty-three degrees (23°) to seventy-one degrees (71°). Preferably, the damper neck taper angle $\alpha$ is in a range from fifty-one degrees (51°) to sixty-nine degrees (69°), as detailed further below. While the damper neck 522 includes one tapered portion, the damper necks herein can include any number of tapered portions of at least one or more.

As shown in FIG. 5, the damper neck 522 includes a first length $L_1$ and a second length $L_2$. The first length L1 is a length of the first portion (the straight portion 530), parallel with the damper neck longitudinal centerline axis 523, from the first portion proximal end to the first portion distal end. In FIG. 5, the first length $L_1$ is the length of the first portion (the straight portion 530) from damper neck inlet 531 to the second portion (the tapered portion 532) (e.g., to the transition portion 535). The second length $L_2$ is a length of the second portion (the tapered portion 532), parallel with the damper neck longitudinal centerline axis 523, from the second portion proximal end to the second portion distal end. In FIG. 5, the second length $L_2$ is the length of the second portion (the tapered portion 532) from the first portion (the straight portion 530) (e.g., from the transition portion 535) to the damper neck outlet 533. A total length of the damper neck 522 is given by a sum of the first length $L_1$ and the second length $L_2$. The first length $L_1$ is in a range from 0% to 99% of the total length of the damper neck 522. The second length $L_2$ is in a range from 1% to 100% of the total length of the damper neck 522.

The damper neck 522 includes a first diameter $D_1$, a second diameter $D_2$, and a third diameter $D_3$. The first diameter $D_1$ is a diameter (an inner diameter at an inner surface) of the first portion (the straight portion 530) at the first portion proximal end that passes through the damper neck longitudinal centerline axis 523. In particular, the first diameter $D_1$ is the diameter of the damper neck 522 at the damper neck inlet 531 that passes through the damper neck longitudinal centerline axis 523. The second diameter $D_2$ is a diameter (an inner diameter at an inner surface) of the second portion (the tapered portion 532) at the second portion proximal end that passes through the damper neck longitudinal centerline axis 523. In particular, the second diameter $D_2$ is the diameter of the damper neck 522 at the transition portion 535 that passes through the damper neck longitudinal centerline axis 523. The third diameter $D_3$ is a diameter (an inner diameter at an inner surface) of the second portion (the tapered portion 532) at the second portion distal end that passes through the damper neck longitudinal centerline axis 523. In FIG. 5, the third diameter $D_3$ is the diameter of the damper neck 522 at the damper neck outlet 533 that passes through the damper neck longitudinal centerline axis 523. The second diameter $D_2$ is equal to the first diameter $D_1$. In some embodiments, the second diameter $D_2$ can be greater than or less than the first diameter $D_1$. The third diameter $D_3$ is greater than the first diameter $D_1$ and the second diameter $D_2$.

Figure 6:
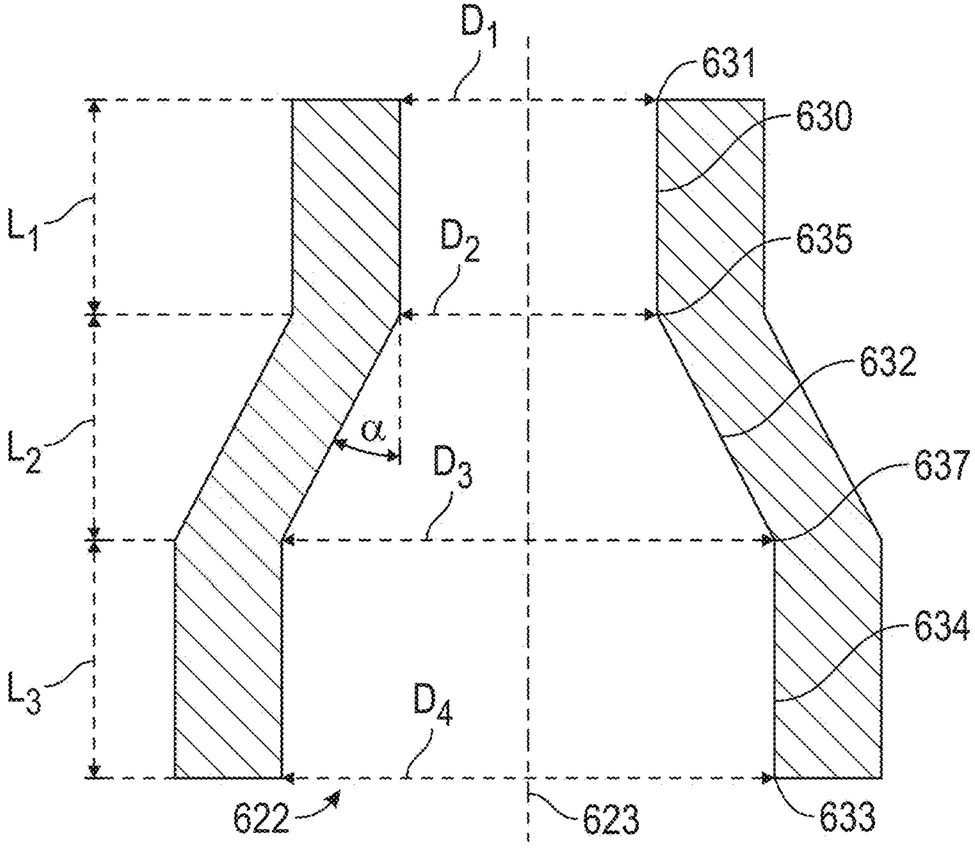
FIG. 6 illustrates a schematic cross-sectional view of a damper neck of a damper, taken along a damper neck longitudinal centerline axis of the damper neck, according to another embodiment.

FIG. 6 illustrates a schematic cross-sectional view of a damper neck 622 of a damper, taken along a damper neck longitudinal centerline axis 623 of the damper neck 622, according to another embodiment. The damper neck 622 is substantially similar to the damper neck 522 of FIG. 5. The same reference numerals will be used for components of the damper neck 622 that are the same as or similar to the components of the damper neck 522 discussed above. The description of these components above also applies to this embodiment, and a detailed description of these components is omitted here. The damper neck 622 can be utilized as the damper neck 322 of FIGS. 3A and 3B or the damper neck 422 of FIG. 4.

The damper neck 622 extends along the damper neck longitudinal centerline axis 623. The damper neck 622 includes a first portion, also referred to as a first straight portion 630), a damper neck inlet 631, a second portion, also referred to as a tapered portion 632, a damper neck outlet 633, and a third portion, also referred to as a second straight portion 634. The first portion (the first straight portion 630) is straight and extends from the first portion proximal end to the first portion distal end. In particular, the first portion proximal end is located at the damper neck inlet 631 and the first portion distal end is located at a first transition portion 635. The first transition portion 635 defines a portion of the damper neck 622 that connects the first portion (the first straight portion 630) and the second portion (the tapered portion 632). In this way, the first portion (the first straight portion 630) extends from the proximal end (e.g., the damper neck inlet 631) of the damper neck 622 to the second portion (the tapered portion 632).

The second portion (the tapered portion 632) is tapered and extends from the second portion proximal end to the second portion distal end. In particular, the second portion proximal end is located at the first transition portion 635 and the second portion distal end is located at a second transition portion 637. The second transition portion 637 defines a portion of the damper neck 622 that connects the second portion (the tapered portion 632) and the third portion (the second straight portion 634). In this way, the second portion (the tapered portion 632) extends from the first portion (the first straight portion 630) to the third portion (the second straight portion 634). The second portion (the tapered portion 632) extends from the first portion (the first straight portion 630) at a damper neck taper angle $\alpha$, as defined above. In FIG. 6, the damper neck taper angle $\alpha$ is positive such that the second portion (the tapered portion 632) tapers outward away from the damper neck longitudinal centerline axis 623.

The third portion (the second straight portion 634) is straight and extends from a third portion proximal end to a third portion distal end. In particular, the third portion proximal end is located at the second transition portion 637 and the third portion distal end is located at the damper neck outlet 633. In this way, the third portion (the second straight portion 634) extends from the second portion (the tapered portion 632) to the damper neck outlet 633. In some embodiments, at least one of the first portion, the second portion, or the third portion is tapered. In this way, the damper neck 622 can include one, two, or three tapered portions.

As shown in FIG. 6, the damper neck 622 includes a first length $L_1$, a second length $L_2$, and a third length $L_3$. The first length $L_1$ is a length of the first portion (the first straight portion 630), parallel with the damper neck longitudinal centerline axis 623, from the first portion proximal end to the first portion distal end. In FIG. 6, the first length $L_1$ is the length of the first portion (the first straight portion 630) from damper neck inlet 631 to the second portion (the tapered portion 632) (e.g., to the first transition portion 635). The second length $L_2$ is a length of the second portion (the tapered portion 632), parallel with the damper neck longitudinal centerline axis 623, from the second portion proximal end to the second portion distal end. In FIG. 6, the second length $L_2$ is the length of the second portion (the tapered portion 632)from the first portion (the first straight portion 630) (e.g., from the first transition portion 635) to the third portion (the second straight portion 634) (e.g., to the second transition portion 637). The third length $L_3$ is a length of the third portion (the second straight portion 634), parallel with the damper neck longitudinal centerline axis 623, from the third portion proximal end to the third portion distal end. In FIG. 6, the third length $L_3$ is the length of third portion (the second straight portion 634) from the second portion (the tapered portion 632) (e.g., from the second transition portion 637) to the damper neck outlet 633. The first length $L_1$ and the second length $L_2$ are in the ranges defined above with respect to FIG. 5. The third length L3 is in a range from 0% to 99% of the total length of the damper neck 622.

The damper neck 622 includes a first diameter $D_1$, a second diameter $D_2$, a third diameter $D_3$, and a fourth diameter $D_4$. The first diameter $D_1$ is a diameter (an inner diameter at an inner surface) of the first portion (the first straight portion 630) at the first portion proximal end that passes through the damper neck longitudinal centerline axis 623. In particular, the first diameter $D_1$ is the diameter of the damper neck 622 at the damper neck inlet 631 that passes through the damper neck longitudinal centerline axis 623. The second diameter $D_2$ is a diameter (an inner diameter at an inner surface) of the second portion (the tapered portion 632) at the second portion proximal end that passes through the damper neck longitudinal centerline axis 623. In particular, the second diameter $D_2$ is the diameter of the damper neck 622 at the first transition portion 635 that passes through the damper neck longitudinal centerline axis 623. The third diameter $D_3$ is a diameter (an inner diameter at an inner surface) of the second portion (the tapered portion 632) at the second portion distal end that passes through the damper neck longitudinal centerline axis 623. In FIG. 6, the third diameter $D_3$ is the diameter of the damper neck 622 at the second transition portion 637 that passes through the damper neck longitudinal centerline axis 623. The fourth diameter $D_4$ is a diameter (an inner diameter at an inner surface) of the third portion (the second straight portion 634) at the third portion distal end that passes through the damper neck longitudinal centerline axis 623. In FIG. 6, the fourth diameter $D_4$ is the diameter of the damper neck 622 at the damper neck outlet 633 that passes through the damper neck longitudinal centerline axis 623.

The second diameter $D_2$ is equal to the first diameter $D_1$. The third diameter $D_3$ is greater than the first diameter $D_1$ and the second diameter $D_2$. The fourth diameter $D_4$ is equal to the third diameter $D_3$.

Figure 7:
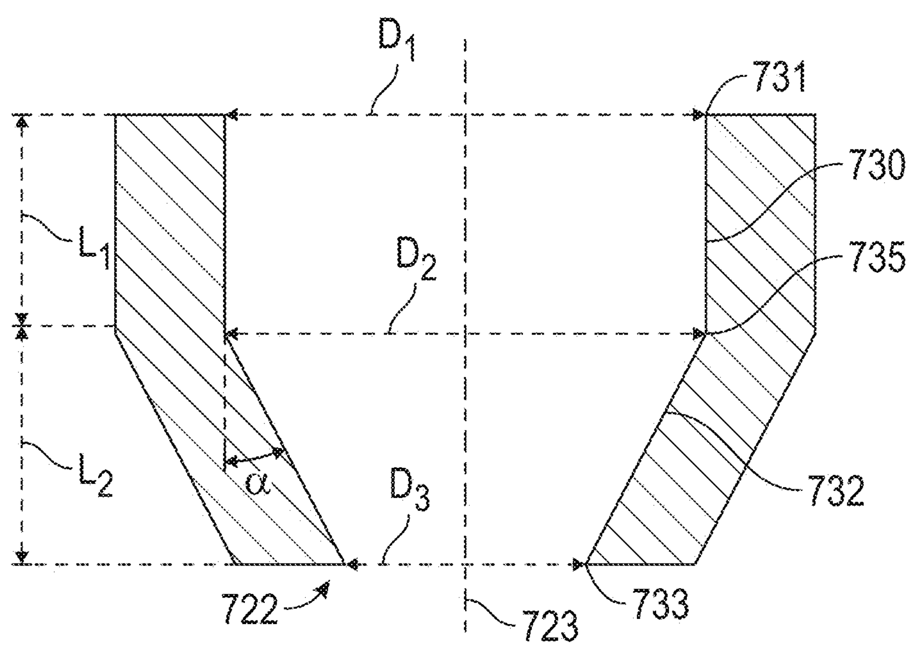
FIG. 7 illustrates a schematic cross-sectional view of a damper neck of a damper, taken along a damper neck longitudinal centerline axis of the damper neck, according to another embodiment.

FIG. 7 illustrates a schematic cross-sectional view of a damper neck 722 of a damper, taken along a damper neck longitudinal centerline axis 723 of the damper neck 722, according to another embodiment. The damper neck 722 is substantially similar to the damper neck 522 of FIG. 5. The same reference numerals will be used for components of the damper neck 722 that are the same as or similar to the components of the damper neck 522 discussed above. The description of these components above also applies to this embodiment, and a detailed description of these components is omitted here. The damper neck 722 can be utilized as the damper neck 322 of FIGS. 3A and 3B or the damper neck 422 of FIG. 4.

The damper neck 722 extends along the damper neck longitudinal centerline axis 723. The damper neck 722 includes a first portion, also referred to as a straight portion 730, a damper neck inlet 731, a second portion, also referred to as a tapered portion 732, a damper neck outlet 733, and a transition portion 735. The first portion (the straight portion) 730 is straight and extends from the first portion proximal end to the first portion distal end. In particular, the first portion proximal end is located at the damper neck inlet 731 and the first portion distal end is located at the transition portion 735.

The second portion (the tapered portion 732) is tapered and extends from the second portion proximal end to the second portion distal end. In particular, the second portion proximal end is located at the transition portion 735 and the second portion distal end is located at the damper neck outlet 733. The second portion (the tapered portion 732) extends from the first portion (the straight portion 730) at a damper neck taper angle α, as defined above. In FIG. 7, the damper neck taper angle α is negative such that the second portion 732 tapers inward toward the damper neck longitudinal centerline axis 723.

As shown in FIG. 7, the damper neck 722 includes a first length $L_1$ and a second length $L_2$, as defined above with respect to FIG. 5. The damper neck 722 includes a first diameter $D_1$, a second diameter $D_2$, and a third diameter $D_3$, as defined above with respect to FIG. 5. In FIG. 7, the third diameter $D_3$ is less than the first diameter $D_1$ and the second diameter $D_2$ as the second portion (the tapered portion 732) tapers inward from the first portion (the straight portion 730).

Figure 8:
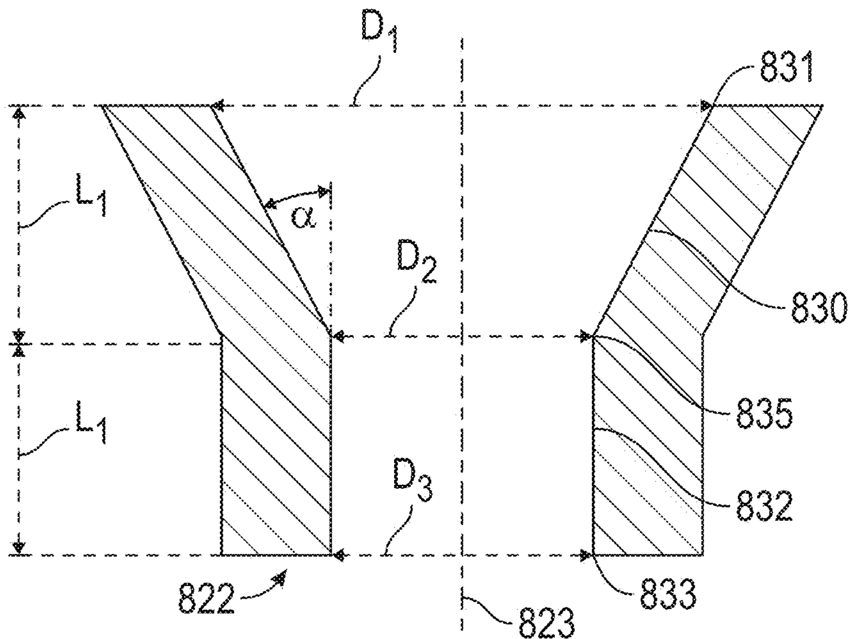
FIG. 8 illustrates a schematic cross-sectional view of a damper neck of a damper, taken along a damper neck longitudinal centerline axis of the damper neck, according to another embodiment.

FIG. 8 illustrates a schematic cross-sectional view of a damper neck 822 of a damper, taken along a damper neck longitudinal centerline axis 823 of the damper neck 822, according to another embodiment. The damper neck 822 is substantially similar to the damper neck 522 of FIG. 5. The same reference numerals will be used for components of the damper neck 822 that are the same as or similar to the components of the damper neck 522 discussed above. The description of these components above also applies to this embodiment, and a detailed description of these components is omitted here. The damper neck 822 can be utilized as the damper neck 322 of FIGS. 3A and 3B or the damper neck 422 of FIG. 4.

The damper neck 822 extends along the damper neck longitudinal centerline axis 823. The damper neck 822 includes a first portion, also referred to as a tapered portion 830, a damper neck inlet 831, a second portion, also referred to as a straight portion 832, a damper neck outlet 833, and a transition portion 835. The first portion (the tapered portion 830) is tapered and extends from the first portion proximal end to the first portion distal end. In particular, the first portion proximal end is located at the damper neck inlet 831 and the first portion distal end is located at the transition portion 835. The first portion (the tapered portion 830) extends from the damper neck inlet 831 at a damper neck taper angle α, as defined above. In FIG. 8, the damper neck taper angle α is negative such that the first portion (the tapered portion 830) tapers inward toward the damper neck longitudinal centerline axis 823 from the damper neck inlet 831 to the second portion (the straight portion 832).

The second portion (the straight portion 832) is straight and extends from the second portion proximal end to the second portion distal end. In particular, the second portion proximal end is located at the transition portion 835 and the second portion distal end is located at the damper neck outlet 833.

As shown in FIG. 8, the damper neck 822 includes a first length $L_1$ and a second length $L_2$, as defined above with respect to FIG. 5. The damper neck 822 includes a first diameter $D_1$, a second diameter $D_2$, and a third diameter $D_3$, as defined above with respect to FIG. 5. In FIG. 8, the first diameter $D_1$ is greater than the second diameter $D_2$ and the third diameter $D_3$ as the first portion (the tapered portion 830) tapers inward from the damper neck inlet 831 to the second portion (the straight portion 832). The third diameter $D_3$ is equal to the second diameter $D_2$.

Figures 9, 10:
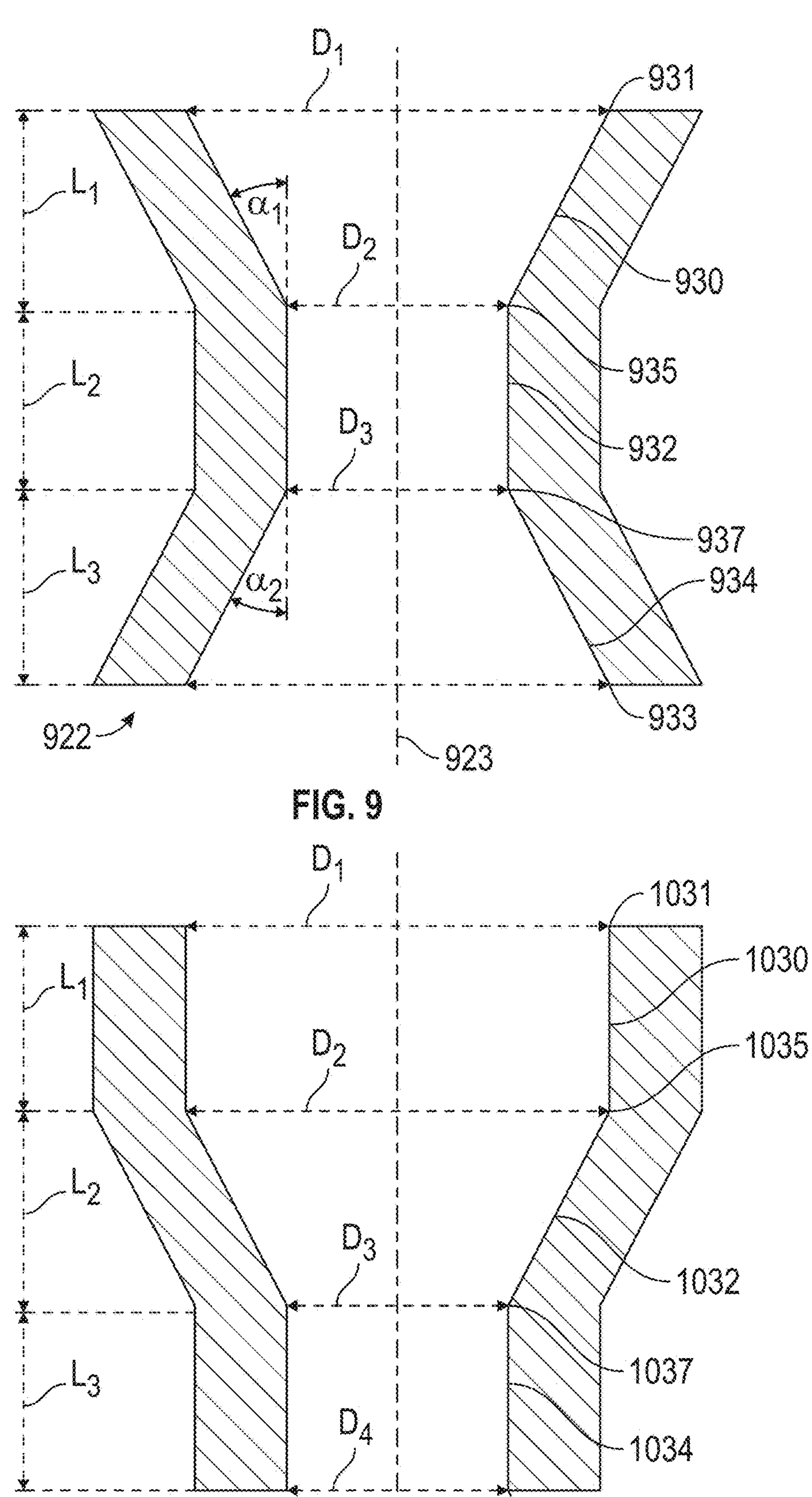
FIG. 9 illustrates a schematic cross-sectional view of a damper neck of a damper, taken along a damper neck longitudinal centerline axis of the damper neck, according to another embodiment.
FIG. 10 illustrates a schematic cross-sectional view of a damper neck of a damper, taken along a damper neck longitudinal centerline axis of the damper neck, according to another embodiment.

FIG. 9 illustrates a schematic cross-sectional view of a damper neck 922 of a damper, taken along a damper neck longitudinal centerline axis 923 of the damper neck 922, according to another embodiment. The damper neck 922 is substantially similar to the damper neck 622 of FIG. 6. The same reference numerals will be used for components of the damper neck 922 that are the same as or similar to the components of the damper neck 622 discussed above. The description of these components above also applies to this embodiment, and a detailed description of these components is omitted here. The damper neck 922 can be utilized as the damper neck 322 of FIGS. 3A and 3B or the damper neck 422 of FIG. 4.

The damper neck 922 extends along the damper neck longitudinal centerline axis 923. The damper neck 922 includes a first portion, also referred to as a first tapered portion 930), a damper neck inlet 931, a second portion, also referred to as a straight portion 932, a damper neck outlet 933, a third portion, also referred to as a second tapered portion 934), a first transition portion 935, and a second transition portion 937. The first portion (the first tapered portion 930) is tapered and extends from the first portion proximal end to the first portion distal end. The first portion (the first tapered portion 930) extends from the damper neck inlet 931 at a first damper neck taper angle $\alpha_1$, as defined above. In FIG. 9, the first damper neck taper angle $\alpha_1$ is negative such that the first portion (the first tapered portion 930) tapers inward toward the damper neck longitudinal centerline axis 923.

The second portion (the straight portion 932) is straight and extends from the second portion proximal end to the second portion distal end. In particular, the second portion (the straight portion 932) extends from the first portion (the first tapered portion 930) to the third portion (the second tapered portion 934).

The third portion (the second tapered portion 934) is tapered and extends from a third portion proximal end to a third portion distal end. In particular, the third portion (the second tapered portion 934) extends from the second portion (the straight portion 932) to the damper neck outlet 933. The third portion (the second tapered portion 934) extends from the second portion (the straight portion 932) at a second damper neck taper angle $\alpha_2$, as defined above. In FIG. 9, the second damper neck taper angle $\alpha_2$ is positive such that the third portion (the second tapered portion 934) tapers outward away from the damper neck longitudinal centerline axis 923.

As shown in FIG. 9, the damper neck 922 includes a first length $L_1$, a second length $L_2$, and a third length $L_3$, as defined above. The damper neck 922 includes a first diameter $D_1$, a second diameter $D_2$, a third diameter $D_3$, and a fourth diameter $D_4$, as defined above. The first diameter D1 is greater than the second diameter D2. The second diameter $D_2$ is equal to the third diameter $D_3$. The fourth diameter $D_4$ is greater than the third diameter $D_3$.

FIG. 10 illustrates a schematic cross-sectional view of a damper neck 1022 of a damper, taken along a damper neck longitudinal centerline axis 1023 of the damper neck 1022, according to another embodiment. The damper neck 1022 is substantially similar to the damper neck 622 of FIG. 6. The same reference numerals will be used for components of the damper neck 1022 that are the same as or similar to the components of the damper neck 622 discussed above. The description of these components above also applies to this embodiment, and a detailed description of these components is omitted here. The damper neck 1022 can be utilized as the damper neck 322 of FIGS. 3A and 3B or the damper neck 422 of FIG. 4.

The damper neck 1022 extends along the damper neck longitudinal centerline axis 1023. The damper neck 1022 includes a first portion, also referred to a first straight portion 1030, a damper neck inlet 1031, a second portion, also referred to as a tapered portion 1032, a damper neck outlet 1033, a third portion, also referred to as a second straight portion 1034, a first transition portion 1035, and a second transition portion 1037. The first portion (the first straight portion 1030) is straight and extends from the first portion proximal end to the first portion distal end. In particular, the first portion (the first straight portion 1030) extends from the damper neck inlet 1031 to the second portion (the tapered portion 1032).

The second portion (the tapered portion 1032) is tapered and extends from the second portion proximal end to the second portion distal end. In particular, the second portion (the tapered portion 1032) extends from the first portion (the first straight portion 1030) to the third portion (the second straight portion 1034). The second portion (the tapered portion 1032) extends from the first portion (the first straight portion 1030) at a damper neck taper angle $\alpha$, as defined above. In FIG. 10, the damper neck taper angle $\alpha$ is negative such that the second portion (the tapered portion 1032) tapers inward toward the damper neck longitudinal centerline axis 1023.

The third portion (the second straight portion 1034) is straight and extends from a third portion proximal end to a third portion distal end. In particular, the third portion (the second straight portion 1034) extends from the second portion (the tapered portion 1032) to the damper neck outlet 1033.

As shown in FIG. 10, the damper neck 1022 includes a first length $L_1$, a second length $L_2$, and a third length $L_3$, as defined above. The damper neck 1022 includes a first diameter $D_1$, a second diameter $D_2$, a third diameter $D_3$, and a fourth diameter $D_4$, as defined above. The first diameter $D_1$ is equal to the second diameter $D_2$. The second diameter $D_2$ is greater than the third diameter $D_3$. The fourth diameter $D_4$ is equal to the third diameter $D_3$.

As discussed above, the inventors sought to address the problem of sizing the damper necks to account for decreasing the hot gas ingestion through the damper necks, while balancing for increasing the damping capabilities of the damper. By way of testing various turbine engine architectures and damper architectures, the inventors experimented with different configurations of the damper necks. In particular, the inventors experimented with various sizes (e.g., diameters and lengths) and cross-sectional shapes of the damper necks (e.g., damper neck taper angles and straight portion configurations).

Table 1 represents exemplary embodiments 1 to 23 of dampers and damper neck designs of the present disclosure. In Table 1, the damper neck taper angle $\alpha_1$ is the damper neck taper angle of the tapered portion of the damper neck. In embodiments that have two tapered portions, $\alpha_1$ is the first damper neck taper angle and $\alpha_2$ is the second damper neck taper angle, as defined above. A positive damper neck taper angle indicates an angle away from the damper neck longitudinal centerline axis and a negative damper neck taper angle indicates an angle towards the damper neck longitudinal centerline axis. Further, in Table 1, $LR_1$ is a first length ratio of the first length $L_1$ to the total length of the respective damper neck, $LR_2$ is a second length ratio of the second length $L_2$ to the total length of the respective damper neck, and $LR_3$ is a third length ratio of the third length $L_3$ to the total length of the respective damper neck. $OAR_1$ is a first open area ratio of a cross-sectional area of the first portion ($1/2\times\pi\times D_1^2$) to a damper cavity cross-sectional area ($1/2\times\pi\times D_{DC}^2$) of the damper cavity ($OAR_1=N_{neck}*D_1^2/D_{DC}^2$), where $N_{neck}$ is the number of damper necks in the damper, $OAR_2$ is a second open area ratio of a cross-sectional area of the second portion ($1/2\times\pi\times D_2^2$) to the damper cavity cross-sectional area ($1/2\times\pi\times D_{DC}^2$) of the damper cavity ($OAR_2=N_{neck}*D_{22}/D_{DC}^2$), $OAR_3$ is a third open area ratio of a cross-sectional area of the third portion ($1/2\times\pi\times D_3^2$) to the damper cavity cross-sectional area ($1/2\times\pi\times D_{DC}^2$) of the damper cavity ($OAR_3=N_{neck}*D_3^2/D_{DC}^2$), and $OAR_4$ is a fourth open area ratio of a cross-sectional area of the fourth portion ($1/2\times\pi\times D_2^2$) to the damper cavity cross-sectional area ($1/2\times\pi\times D_{DC}^2$) of the damper cavity ($OAR_4=N_{neck}*D_4^2/D_{DC}^2$).

TABLE 1

| Emb. | $LR_1$ | $LR_2$ | $LR_3$ | $OAR_1$ | $OAR_2$ | $OAR_3$ | $OAR_4$ | $\alpha_1$ | $\alpha_2$ |
|---|---|---|---|---|---|---|---|---|---|
| 1 | 0.33 | 0.33 | 0.33 | 0.29 | 0.29 | 0.29 | 0.29 | — | — |
| 2 | 0.33 | 0.33 | 0.33 | 0.22 | 0.22 | 0.22 | 0.22 | — | — |
| 3 | 0.33 | 0.33 | 0.33 | 0.42 | 0.42 | 0.42 | 0.42 | — | — |
| 4 | 0.5 | 0.5 | — | 0.42 | 0.42 | 0.22 | — | −27.4 | — |
| 5 | 0.5 | 0.5 | — | 0.44 | 0.44 | 0.22 | — | −61.8 | — |
| 6 | 0.5 | 0.5 | — | 0.28 | 0.28 | 0.55 | — | 64.5 | — |
| 7 | 0.5 | 0.5 | — | 0.26 | 0.26 | 0.55 | — | 66.68 | — |
| 8 | 0.5 | 0.5 | — | 0.24 | 0.24 | 0.55 | — | 68.0 | — |
| 9 | 0.5 | 0.5 | — | 0.24 | 0.24 | 0.46 | — | 62.7 | — |
| 10 | 0.5 | 0.5 | — | 0.23 | 0.23 | 0.55 | — | 68.8 | — |
| 11 | 0.5 | 0.5 | — | 0.23 | 0.23 | 0.55 | — | 44.1 | — |
| 12 | 0.5 | 0.5 | — | 0.22 | 0.22 | 0.42 | — | 27.4 | — |
| 13 | 0.15 | 0.85 | — | 0.28 | 0.28 | 0.55 | — | 51.0 | — |
| 14 | 0.15 | 0.85 | — | 0.28 | 0.28 | 1 | — | 70.0 | — |
| 15 | 0.5 | 0.4 | 0.1 | 0.42 | 0.42 | 0.19 | 0.19 | −38.6 | — |
| 16 | 0.5 | 0.4 | 0.1 | 0.42 | 0.42 | 0.19 | 0.19 | −35.9 | — |
| 17 | 0.5 | 0.4 | 0.1 | 0.33 | 0.33 | 0.22 | 0.22 | −23.6 | — |
| 18 | 0.5 | 0.4 | 0.1 | 0.38 | 0.38 | 0.22 | 0.22 | −29.8 | — |
| 19 | 0.5 | 0.4 | 0.1 | 0.38 | 0.38 | 0.22 | 0.22 | −27.6 | — |
| 20 | 0.1 | 0.4 | 0.5 | 0.22 | 0.22 | 0.33 | 0.33 | 23.6 | — |
| 21 | 0.8 | 0.15 | — | 0.55 | 0.28 | 0.28 | — | −51.0 | — |
| 22 | 0.42 | 0.15 | 0.42 | 0.55 | 0.28 | 0.28 | 0.55 | −67.9 | 67.9 |
| 23 | 0.5 | 0.5 | — | 0.42 | 0.22 | 0.42 | — | −27.4 | 27.4 |

In Table 1, embodiments 1 to 3 include one or more damper necks with only a straight portion and do not include a tapered portion. Embodiments 4 to 14 include one or more damper necks with a first portion that is a straight portion and a second portion that is a tapered portion (e.g., the damper neck 522 of FIG. 5 for positive damper neck taper angles and the damper neck 722 of FIG. 7 for negative damper taper angles). Embodiments 15 to 20 include one or more damper necks with a first portion that is a straight portion, a second portion that is a tapered portion, and a third portion that is a straight portion (e.g., the damper neck 622 of FIG. 6 for positive damper neck taper angles and the damper neck 1022 of FIG. 10 for negative damper neck taper angles). Embodiment 21 includes one or more damper necks with a first portion that is a tapered portion and a second portion that is a straight portion (e.g., the damper neck 822 of FIG. 8 having a negative damper neck taper angle). Embodiment 22 includes one or more damper necks with a first portion that is a tapered portion, a second portion that is a straight portion, and a third portion that is a tapered portion (e.g., the damper neck 922 of FIG. 9 having a negative first damper neck taper angle and a positive second damper neck taper angle). Embodiment 23 includes a first portion that is a tapered portion and a second portion that is a tapered portion.

During the course of evaluating the different embodiments as set forth herein, with the goal of providing a damper that accounts for the hot gas ingestion requirements, while balancing for the damping requirements, the inventors determined that a damper neck with a straight portion followed by a tapered portion with a positive damper neck taper angle provided for decreasing the hot gas ingestion, while increasing the damper capabilities as compared to damper necks having only straight portions.

With reference to Table 1, the inventors determined that embodiments 6 to 10, 13, and 22 having a damper neck taper angle in a range from fifty-one degrees (51°) to sixty-nine degrees (69°), provide for low hot gas ingestion (e.g., temperature rise in the damper cavity less than 10%) and high acoustic damping (e.g., dynamic pressure reduction through the damper greater than 50%).

Embodiment 17 has high hot gas ingestion (e.g., temperature rise in the damper cavity greater than 10%) and low acoustic damping (e.g., dynamic pressure reduction through the damper less than 50%). Embodiments 1 to 3, 5, 11, 12, 14, 17, 20, and 21 have low hot gas ingestion (e.g., temperature rise in the damper cavity less than 10%), but have low acoustic damping (e.g., dynamic pressure reduction through the damper less than 50%). Embodiments 4, 15, 16, 18, 19, and 23 have high acoustic damping (e.g., dynamic pressure reduction through the damper greater than 50%), but have high hot gas ingestion (e.g., temperature rise in the damper cavity greater than 10%). As detailed above, embodiments 6 to 10, 13, and 22, having a damper neck taper angle in a range from fifty-one degrees (51°) to sixty-nine degrees (69°), provide for low hot gas ingestion (e.g., temperature rise in the damper cavity less than 10%) and high acoustic damping (e.g., dynamic pressure reduction through the damper greater than 50%). Accordingly, preferably, the damper neck taper angle is in the range of fifty-one degrees (51°) to sixty-nine degrees (69°).

After evaluating the novel and inventive designs developed by the inventors including, which designs were based on various damper architectures representing various damper neck designs with various sizes and cross-sectional shapes, the inventors discovered, unexpectedly, that the inventive designs, producing favorable results, could be characterized by a combination of the second diameter $D_2$, the third diameter $D_3$, and the damper neck taper angle $\alpha$. Moreover, this combination of $D_2$, $D_3$, and the damper neck taper angle $\alpha$ was also able to differentiate a damper producing a favorable balance of hot gas ingestion and damping from those designs that did not produce either favorable hot gas ingestion or favorable damping. As such, a finite and readily ascertainable number of embodiments can be characterized, embodiments representing reduced hot gas ingestion, without overly sacrificed acoustic damping capabilities of the damper. The inventors developed a set of designs based on a tapered portion inlet diameter $D_{inlet}$, (e.g., the second diameter $D_2$), a tapered portion outlet diameter $D_{outlet}$ (e.g., the third diameter $D_3$), a tapered portion length $L_{tapered}$ (e.g., the second length $L_2$), and the damper neck taper angle $\alpha$ that can decrease the hot gas ingestion (e.g., temperature rise in the damper cavity less than 10%), while accounting for the acoustic damping requirements for a particular damper.

The novel and inventive designs producing favorable results can be distinguished from designs producing unfa- $\alpha_2$ is the second damper neck taper angle, as defined above. A positive damper neck taper angle indicates an angle away from the damper neck longitudinal centerline axis and a negative damper neck taper angle indicates an angle towards the damper neck longitudinal centerline axis.

TABLE 2

| Emb. | $LR_1$ | $LR_2$ | $LR_3$ | $OAR_1$ | $OAR_2$ | $OAR_3$ | $OAR_4$ | $\alpha_1$ | $\alpha_2$ | DNIR |
|---|---|---|---|---|---|---|---|---|---|---|
| 1 | 0.33 | 0.33 | 0.33 | 0.29 | 0.29 | 0.29 | 0.29 | — | — | — |
| 2 | 0.33 | 0.33 | 0.33 | 0.22 | 0.22 | 0.22 | 0.22 | — | — | — |
| 3 | 0.33 | 0.33 | 0.33 | 0.42 | 0.42 | 0.42 | 0.42 | — | — | — |
| 4 | 0.5 | 0.5 | — | 0.42 | 0.42 | 0.22 | — | −27.4 | — | −37.26 |
| 5 | 0.5 | 0.5 | — | 0.44 | 0.44 | 0.22 | — | −61.8 | — | −16.16 |
| 6 | 0.5 | 0.5 | — | 0.28 | 0.28 | 0.55 | — | 64.5 | — | 38.18 |
| 7 | 0.5 | 0.5 | — | 0.26 | 0.26 | 0.55 | — | 66.68 | — | 39.22 |
| 8 | 0.5 | 0.5 | — | 0.24 | 0.24 | 0.55 | — | 68.0 | — | 41.03 |
| 9 | 0.5 | 0.5 | — | 0.24 | 0.24 | 0.46 | — | 62.7 | — | 38.52 |
| 10 | 0.5 | 0.5 | — | 0.23 | 0.23 | 0.55 | — | 68.8 | — | 42.02 |
| 11 | 0.5 | 0.5 | — | 0.23 | 0.23 | 0.55 | — | 44.1 | — | 65.52 |
| 12 | 0.5 | 0.5 | — | 0.22 | 0.22 | 0.42 | — | 27.4 | — | 87.68 |
| 13 | 0.15 | 0.85 | — | 0.28 | 0.28 | 0.55 | — | 51.0 | — | 55.17 |
| 14 | 0.15 | 0.85 | — | 0.28 | 0.28 | 1.00 | — | 70.0 | — | 63.13 |
| 15 | 0.5 | 0.4 | 0.1 | 0.42 | 0.42 | 0.19 | 0.19 | −38.6 | — | −22.05 |
| 16 | 0.5 | 0.4 | 0.1 | 0.42 | 0.42 | 0.19 | 0.19 | −35.9 | — | −23.72 |
| 17 | 0.5 | 0.4 | 0.1 | 0.33 | 0.33 | 0.22 | 0.22 | −23.6 | — | −45.14 |
| 18 | 0.5 | 0.4 | 0.1 | 0.38 | 0.38 | 0.22 | 0.22 | −29.8 | — | −32.74 |
| 19 | 0.5 | 0.4 | 0.1 | 0.38 | 0.38 | 0.22 | 0.22 | −27.6 | — | −35.34 |
| 20 | 0.1 | 0.4 | 0.5 | 0.22 | 0.22 | 0.33 | 0.33 | 23.6 | — | 80.41 |
| 21 | 0.8 | 0.15 | — | 0.55 | 0.28 | 0.28 | — | −51.0 | — | −26.64 |
| 22 | 0.42 | 0.15 | 0.42 | 0.55 | 0.28 | 0.28 | 0.55 | −67.9 | 67.9 | 35.16 |
| 23 | 0.5 | 0.5 | — | 0.42 | 0.22 | 0.42 | — | −27.4 | 27.4 | 87.68 |

vorable results using an expression (1) referred to as a Damper Neck Ingestion Ratio (DNIR):

$$DNIR = \frac{\left(\left(\frac{OAR_{outlet}}{OAR_{inlet}}\right) + LR_{tapered}\right) \times 1000}{\alpha}. \quad (1)$$

In expression (1), $OAR_{outlet}$ is the open area ratio a cross-sectional area of an outlet end of the tapered portion to the cross-sectional area of the damper cavity, $OAR_{inlet}$ is the open area ratio of a cross-sectional area of an inlet end of the tapered portion to the cross-sectional area of the damper cavity, $LR_{tapered}$ is the length ratio of the length of the tapered portion to the total length of the respective damper neck, and a is the damper neck taper angle of the tapered portion. The tapered portion can be, for example, the tapered portion 532 in FIG. 5 or the tapered portion 632 of FIG. 6. $OAR_{outlet}$ is, for example, the third open area ratio $OAR_3$, $OAR_{inlet}$ is, for example, the second open area ratio $OAR_2$, and $LR_{tapered}$ is, for example, the second length ratio $LR_2$, as defined above.

As mentioned above, and discussed further below, the inventors developed damper designs for different turbine engine architectures that account for increasing the acoustic damping of the damper, while decreasing the hot gas ingestion through the damper necks.

Table 2 below represents embodiments 1 to 23 and their corresponding DNIR values for various dampers and damper neck designs. In Table 2, the DNIR values were determined based on expression (1) described above.

In Table 2, $LR_1$, $LR_2$, $LR_3$, $OAR_1$, $OAR_2$, $OAR_3$, and $OAR_4$ are defined as detailed above. The damper neck taper angle $\alpha_1$ is the damper neck taper angle of the tapered portion of the damper neck. In embodiments that have two tapered portions, $\alpha_1$ is the first damper neck taper angle and The inventor designs provide the aforementioned benefits, including achieving increased acoustic damping and decreased hot gas ingestion. During the course of creating those designs, the inventors determined the ranges that would be suitable to achieve the desired results, while taking into account the acoustic damping requirements and the hot gas ingestion requirements. The values for terms used to compute a DNIR value are strictly limited to certain ranges based on the various designs evaluated. A value used for a term used to compute an expression but not adhering to certain ranges (as provided below) does not produce favorable results.

The DNIR value is only valid an outlet open area ratio $OAR_{outlet}$ in a range from 0.46 to 0.55. Values closer to 0.46 provide for a more decreased hot gas ingestion, but a less increased acoustic damping. Values closer to 0.55 provide for a more increased acoustic damping, but a less decreased hot gas ingestion.

The DNIR value is only valid for an inlet open area ratio $OAR_{inlet}$ in a range from 0.23 to 0.28. Values closer to 0.23 provide for a more decreased hot gas ingestion, but a less increased acoustic damping. Values closer to 0.28 provide for a more increased acoustic damping, but a less decreased hot gas ingestion.

The DNIR value is only valid for a tapered portion length ratio $LR_{tapered}$ in a range from 0.425 to 0.85. Values closer to 0.425 provide for a more decreased hot gas ingestion, but a less increased acoustic damping. Values closer to 0.85 provide for a more increased acoustic damping, but a less decreased hot gas ingestion.

The DNIR value is only valid for a damper neck taper angle in a range from 51° to 69°. As discussed above, values of the damper neck taper angle in this range provide for a damper with low hot gas ingestion and high acoustic damping. As further discussed above, damper necks having a damper neck taper angle outside of this range (e.g., less than 51° or greater than 69°) have high hot gas ingestion or low acoustic damping or have both high hot gas ingestion and low acoustic damping.

Figure 11:
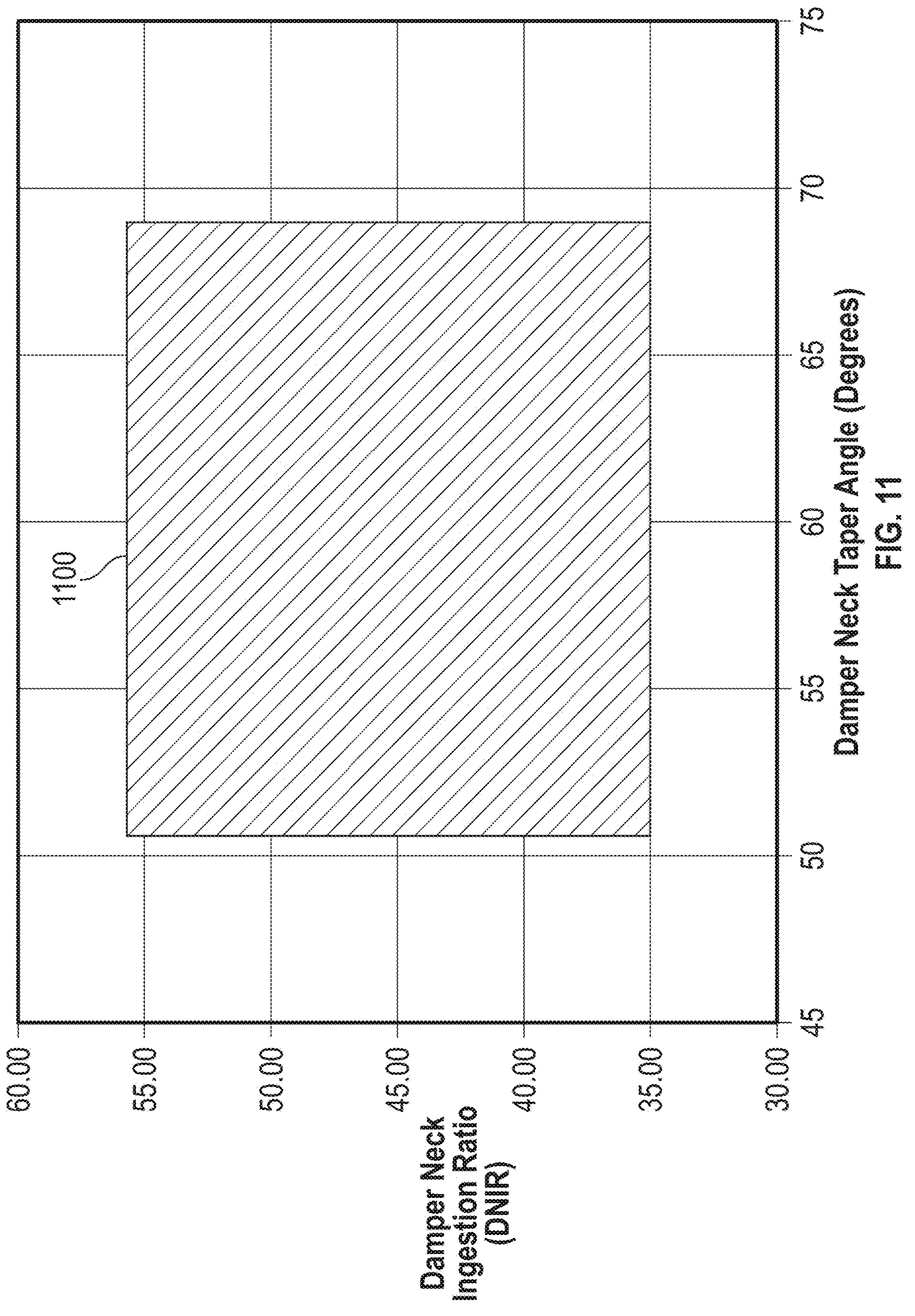
FIG. 11 represents, in graph form, a damper neck ingestion ratio as a function of a damper neck taper angle, according to the present disclosure.

FIG. 11 represents, in graph form, the DNIR value as a function of a damper neck taper angle, according to the present disclosure. An area 1100 represents the boundaries of the DNIR value. The DNIR value is in a range from 35.00 to 56.00 for a damper neck taper angle in a range from 51° to 69°. The valid range for the DNIR value identifies the specific architectures that satisfy the hot gas ingestion requirements, while accounting for the acoustic damping requirements for a particular damper and combustion section. In particular, if the DNIR value is within the area 1100 (e.g., embodiments 6 to 10, 13, and 22), the damper with the damper necks herein are capable of providing a high acoustic damping, while lowering the hot gas ingestion as compared to dampers without the benefit of the present disclosure. Embodiments 6 to 10, 13, and 22 fall within the area 1100 and are capable of providing such benefits. If the DNIR value is outside of the area 1100 (e.g., embodiments 1 to 5, 12, and 14 to 23), then the acoustic damping is low, the hot gas ingestion is high, or both the acoustic damping is low and the hot gas ingestion is high. These embodiments (embodiments 1 to 5, 12, and 14 to 23) do not produce favorable results. Thus, a damper having a DNIR value within the area 1100 provides for an improved damper capable of providing a high acoustic damping and a low hot gas ingestion. In particular, a damper having a DNIR within the area 1100 provides improvements to combustion dynamics, to engine operability, to engine durability, and, indirectly, to emissions, as compared to dampers without the benefit of the present disclosure.

Table 3 provides a summary of the ranges of the $OAR_{outlet}$, the $OAR_{inlet}$, the damper neck taper angle α, and the DNIR value that provide the benefits detailed above.

TABLE 3

| Ranges | $OAR_{outlet}$ | $OAR_{inlet}$ | $LR_{tapered}$ | α | DNIR |
|---|---|---|---|---|---|
| Lower Bound | 0.46 | 0.23 | 0.425 | 51° | 35.00 |
| Upper Bound | 0.55 | 0.28 | 0.85 | 69° | 56.00 |

Further aspects are provided by the subject matter of the following clauses.

A combustor for a turbine engine, the combustor including a combustion chamber that is configured to combust a mixture of a fuel flow and a compressed air flow to generate combustion products, and a damper in fluid communication with the combustion chamber to damp an instability generated in the combustion chamber by the combustion products, the damper including a damper cavity, and one or more damper necks that provide fluid communication between the damper cavity and the combustion chamber, the one or more damper necks extending along a damper neck longitudinal centerline axis and including a tapered portion that extends at a damper neck taper angle α with respect to the damper neck longitudinal centerline axis that is greater than or less than zero.

The combustor of the preceding clause, the tapered portion extending at a damper neck taper angle in a range from −68° to −23° or is in a range from 23° to 71°.

The combustor of any preceding clause, the damper neck taper angle being in a range from 51° to 69°.

The combustor of any preceding clause, the one or more damper necks extending from a damper neck inlet at the damper cavity to a damper neck outlet at the combustion chamber and include a straight portion that extends from the damper neck inlet towards the damper neck outlet to the tapered portion.

The combustor of any preceding clause, the tapered portion extending from the straight portion to the damper neck outlet.

The combustor of any preceding clause, the straight portion being a first straight portion and the one or more damper necks include a second straight portion that extends from the tapered portion to the damper neck outlet.

The combustor of any preceding clause, the damper being characterized by a damper neck ingestion ratio (DNIR) value in a range from 35.00 to 56.00, the DNIR value given by $$DNIR = \frac{\left(\left(\frac{OAR_{outlet}}{OAR_{inlet}}\right) + LR_{tapered}\right) \times 1000}{\alpha},$$

$OAR_{outlet}$ being a ratio of a tapered portion outlet diameter of the tapered portion to a damper cavity diameter of the damper cavity times a number of the one or more damper necks in the damper, $OAR_{inlet}$ is a ratio of a tapered portion inlet diameter of the tapered portion to the damper cavity diameter times the number of the one or more damper necks in the damper, and $LR_{tapered}$ is a ratio of a tapered portion length of the tapered portion to a total length of each of the one or more damper necks.

The combustor of any preceding clause, the $OAR_{outlet}$ being in a range from 0.46 to 0.55.

The combustor of any preceding clause, the $OAR_{inlet}$ being in a range from 0.23 to 0.28.

The combustor of any preceding clause, $LR_{tapered}$ being in a range from 0.425 to 0.85.

The combustor of any preceding clause, the one or more damper necks including one damper neck.

The combustor of any preceding clause, the one or more damper necks including a plurality of damper necks.

The combustor of any preceding clause, the one or more damper necks extending from a damper neck inlet to a damper neck outlet.

The combustor of any preceding clause, the one or more damper necks including a straight portion.

The combustor of any preceding clause, wherein the tapered portion tapers outward.

The combustor of any preceding clause, wherein the tapered portion tapers inward.

The combustor of any preceding clause, wherein the straight portion extends from the damper neck inlet to the tapered portion.

The combustor of any preceding clause, wherein the tapered portion extends from the damper neck inlet to the straight portion.

The combustor of any preceding clause, wherein the tapered portion is a first tapered portion, and the one or more damper necks including a second tapered portion.

The combustor of the preceding clause, wherein the first tapered portion extends from the damper neck inlet to the straight portion and the second tapered portion extends from the straight portion to the damper neck outlet.

A turbine engine including a compressor section for compressing air flowing therethrough to provide a compressed air flow, a combustor including a combustion chamber that is configured to combust a mixture of a fuel flow and the compressed air flow to generate combustion products, a turbine section having at least one turbine driven by the combustion products, and a damper in fluid communication with the combustion chamber to damp an instability generated in the combustion chamber by the combustion products, the damper including a damper cavity, and one or more damper necks that provide fluid communication between the damper cavity and the combustion chamber, the one or more damper necks extending along a damper neck longitudinal centerline axis and including a tapered portion that extends at a damper neck taper angle α with respect to the damper neck longitudinal centerline axis that is greater than or less than zero.

The turbine engine of any preceding clause, the tapered portion extending at a damper neck taper angle in a range from −68° to −23° or is in a range from 23° to 71°.

The turbine engine of any preceding clause, the damper neck taper angle being in a range from 51° to 69°.

The turbine engine of any preceding clause, the one or more damper necks extending from a damper neck inlet at the damper cavity to a damper neck outlet at the combustion chamber and include a straight portion that extends from the damper neck inlet towards the damper neck outlet to the tapered portion.

The turbine engine of any preceding clause, the tapered portion extending from the straight portion to the damper neck outlet.

The turbine engine of any preceding clause, the straight portion being a first straight portion and the one or more damper necks include a second straight portion that extends from the tapered portion to the damper neck outlet.

The turbine engine of any preceding clause, the damper being characterized by a damper neck ingestion ratio (DNIR) value in a range from 35.00 to 56.00, the DNIR value given by $$DNIR = \frac{\left(\left(\frac{OAR_{outlet}}{OAR_{inlet}}\right) + LR_{tapered}\right) \times 1000}{\alpha},$$

$OAR_{outlet}$ being a ratio of a tapered portion outlet diameter of the tapered portion to a damper cavity diameter of the damper cavity times a number of the one or more damper necks in the damper, $OAR_{inlet}$ is a ratio of a tapered portion inlet diameter of the tapered portion to the damper cavity diameter times the number of the one or more damper necks in the damper, and $LR_{tapered}$ is a ratio of a tapered portion length of the tapered portion to a total length of each of the one or more damper necks.

The turbine engine of any preceding clause, the $OAR_{outlet}$ being in a range from 0.46 to 0.55.

The turbine engine of any preceding clause, the $OAR_{inlet}$ being in a range from 0.23 to 0.28.

The turbine engine of any preceding clause, $LR_{tapered}$ being in a range from 0.425 to 0.85.

The turbine engine of any preceding clause, the one or more damper necks including one damper neck.

The turbine engine of any preceding clause, the one or more damper necks including a plurality of damper necks.

The turbine engine of any preceding clause, the one or more damper necks extending from a damper neck inlet to a damper neck outlet.

The turbine engine of any preceding clause, the one or more damper necks including a straight portion.

The turbine engine of any preceding clause, wherein the tapered portion tapers outward.

The turbine engine of any preceding clause, wherein the tapered portion tapers inward.

The turbine engine of any preceding clause, wherein the straight portion extends from the damper neck inlet to the tapered portion.

The turbine engine of any preceding clause, wherein the tapered portion extends from the damper neck inlet to the straight portion.

The turbine engine of any preceding clause, wherein the tapered portion is a first tapered portion, and the one or more damper necks including a second tapered portion.

The turbine engine of the preceding clause, wherein the first tapered portion extends from the damper neck inlet to the straight portion and the second tapered portion extends from the straight portion to the damper neck outlet.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A combustor for a turbine engine, the combustor comprising:

- a combustion chamber that is configured to combust a mixture of a fuel flow and a compressed air flow to generate combustion products; and
- a damper in fluid communication with the combustion chamber to damp an instability generated in the combustion chamber by the combustion products, the damper including:
  - a damper cavity; and
  - one or more damper necks that provide fluid communication between the damper cavity and the combustion chamber, the one or more damper necks extending along a damper neck longitudinal centerline axis and including a tapered portion that extends at a damper neck taper angle α with respect to the damper neck longitudinal centerline axis that is in a range from 51° to 69°.

2. The combustor of claim 1, wherein the one or more damper necks extend from a damper neck inlet at the damper cavity to a damper neck outlet at the combustion chamber and include a straight portion that extends from the damper neck inlet towards the damper neck outlet to the tapered portion.

3. The combustor of claim 2, wherein the tapered portion extends from the straight portion to the damper neck outlet.

4. The combustor of claim 2, wherein the straight portion is a first straight portion, and the one or more damper necks include a second straight portion that extends from the tapered portion to the damper neck outlet.

5. The combustor of claim 1, wherein the damper is characterized by a damper neck ingestion ratio (DNIR) value in a range from $35.00(°)^{-1}$ to $56.00(°)^{-1}$, the DNIR value given by:

$$DNIR = \frac{\left(\left(\frac{OAR_{outlet}}{OAR_{inlet}}\right) + LR_{tapered}\right) \times 1000}{\alpha},$$

where $OAR_{outlet}$ is a ratio of a tapered portion outlet diameter of the tapered portion to a damper cavity diameter of the damper cavity times a number of the one or more damper necks in the damper, $OAR_{inlet}$ is a ratio of a tapered portion inlet diameter of the tapered portion to the damper cavity diameter times the number of the one or more damper necks in the damper, $LR_{tapered}$ is a ratio of a tapered portion length of the tapered portion to a total length of each of the one or more damper necks, and $\alpha$ is the damper neck taper angle in degrees.

6. The combustor of claim 5, wherein the $OAR_{outlet}$ is in a range from 0.46 to 0.55.

7. The combustor of claim 5, wherein the $OAR_{inlet}$ is in a range from 0.23 to 0.28.

8. The combustor of claim 5, wherein $LR_{tapered}$ is in a range from 0.425 to 0.85.

9. A turbine engine comprising:

a compressor section for compressing air flowing therethrough to provide a compressed air flow;

a combustor including a combustion chamber that is configured to combust a mixture of a fuel flow and the compressed air flow to generate combustion products;

a turbine section having at least one turbine driven by the combustion products; and a damper in fluid communication with the combustion chamber to damp an instability generated in the combustion chamber by the combustion products, the damper including:

a damper cavity; and one or more damper necks that provide fluid communication between the damper cavity and the combustion chamber, the one or more damper necks extending along a damper neck longitudinal centerline axis and including a tapered portion that extends at a damper neck taper angle $\alpha$ with respect to the damper neck longitudinal centerline axis that is in a range from 51° to 69°.

10. The turbine engine of claim 9, wherein the one or more damper necks extend from a damper neck inlet at the damper cavity to a damper neck outlet at the combustion chamber and include a straight portion that extends from the damper neck inlet towards the damper neck outlet to the tapered portion.

11. The turbine engine of claim 10, wherein the tapered portion extends from the straight portion to the damper neck outlet.

12. The turbine engine of claim 10, wherein the straight portion is a first straight portion, and the one or more damper necks include a second straight portion that extends from the tapered portion to the damper neck outlet.

13. The turbine engine of claim 9, wherein the damper is characterized by a damper neck ingestion ratio (DNIR) value in a range from $35.00(°)^{-1}$ to $56.00(°)^{-1}$, the DNIR value given by:

$$DNIR = \frac{\left(\left(\frac{OAR_{outlet}}{OAR_{inlet}}\right) + LR_{tapered}\right) \times 1000}{\alpha},$$

where $OAR_{outlet}$ is a ratio of a tapered portion outlet diameter of the tapered portion to a damper cavity diameter of the damper cavity times a number of the one or more damper necks in the damper, $OAR_{inlet}$ is a ratio of a tapered portion inlet diameter of the tapered portion to the damper cavity diameter times the number of the one or more damper necks in the damper, $LR_{tapered}$ is a ratio of a tapered portion length of the tapered portion to a total length of each of the one or more damper necks, and $\alpha$ is the damper neck taper angle in degrees.

14. The turbine engine of claim 13, wherein the $OAR_{outlet}$ is in a range from 0.46 to 0.55.

15. The turbine engine of claim 13, wherein the $OAR_{inlet}$ is in a range from 0.23 to 0.28.

16. The turbine engine of claim 13, wherein $LR_{tapered}$ is in a range from 0.425 to 0.85.

17. A combustor for a turbine engine, the combustor comprising:

a combustion chamber that is configured to combust a mixture of a fuel flow and a compressed air flow to generate combustion products; and a damper in fluid communication with the combustion chamber to damp an instability generated in the combustion chamber by the combustion products, the damper including:

a damper cavity; and one or more damper necks that provide fluid communication between the damper cavity and the combustion chamber, the one or more damper necks extending along a damper neck longitudinal centerline axis and including a tapered portion that extends at a damper neck taper angle $\alpha$ with respect to the damper neck longitudinal centerline axis that is greater than or less than zero, wherein the damper is characterized by a damper neck ingestion ratio (DNIR) value in a range from $35.00(°)^{-1}$ to $56.00 (°)^{-1}$ the DNIR value given by:

$$DNIR = \frac{\left(\left(\frac{OAR_{outlet}}{OAR_{inlet}}\right) + LR_{tapered}\right) \times 1000}{\alpha},$$

where $OAR_{outlet}$ is a ratio of a tapered portion outlet diameter of the tapered portion to a damper cavity diameter of the damper cavity times a number of the one or more damper necks in the damper, $OAR_{inlet}$ is a ratio of a tapered portion inlet diameter of the tapered portion to the damper cavity diameter times the number of the one or more damper necks in the damper, $LR_{tapered}$ is a ratio of a tapered portion length of the tapered portion to a total length of each of the one or more damper necks, and $\alpha$ is the damper neck taper angle in degrees.

18. The combustor of claim 17, wherein the $OAR_{outlet}$ is in a range from 0.46 to 0.55.

19. The combustor of claim 17, wherein the $OAR_{inlet}$ is in a range from 0.23 to 0.28.

20. The combustor of claim 17, wherein $LR_{tapered}$ is in a range from 0.425 to 0.85.

* * * * *